United States Patent
Tupper et al.

(10) Patent No.: US 8,925,627 B2
(45) Date of Patent: Jan. 6, 2015

(54) COILED UMBILICAL TUBING

(75) Inventors: Michael L. Tupper, Lafayette, CO (US);
Craig Hazelton, Lafayette, CO (US);
Robert Worrall, Naples, CO (US);
Kimiko Kano, Boulder, CO (US);
Matthew W. Hooker, Longmont, CO (US); Naseem A. Munshi, Lafayette, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 0 days.

(21) Appl. No.: 13/177,368

(22) Filed: Jul. 6, 2011

(65) Prior Publication Data

US 2012/0006444 A1     Jan. 12, 2012

Related U.S. Application Data

(60) Provisional application No. 61/362,153, filed on Jul. 7, 2010, provisional application No. 61/488,083, filed on May 19, 2011.

(51) Int. Cl.
*E21B 19/22*         (2006.01)
(Continued)

(52) U.S. Cl.
CPC ............ *F16L 9/17* (2013.01); *E21B 17/203* (2013.01); *E21B 17/206* (2013.01); *E21B 43/2401* (2013.01); *E21B 23/14* (2013.01); *E21B 43/127* (2013.01); *E21B 36/04* (2013.01); *H01B 7/046* (2013.01); *E21B 17/20* (2013.01)
USPC .......................... 166/77.2; 166/65.1; 166/302

(58) Field of Classification Search
CPC ..... E21B 17/20; E21B 17/203; E21B 17/206; E21B 23/14; E21B 43/127; E21B 43/2401; E21B 36/04; F16L 9/17; F16L 9/14; F16L 9/22; H01B 7/046
USPC ............... 166/77.2, 65.1, 302.57, 367, 272.1; 251/58; 228/102, 130, 148, 17.5, 9; 138/149, 155, 120
See application file for complete search history.

(56) References Cited

U.S. PATENT DOCUMENTS

| 3,291,636 A | 12/1966 | Reighter et al. |
| 3,548,605 A | 12/1970 | Armistead et al. |

(Continued)

FOREIGN PATENT DOCUMENTS

DE        2 335 391 A1     2/1974

OTHER PUBLICATIONS

Author Unknown, "Another look at an old source," Associated Press, Oct. 4, 2005, [retrieved on Apr. 11, 2005, 2 page. Retrieved from: http://www.dailycamera.com/bdc/national_intl_business/article/0,1713,BDC_2464_4129743,00.html.

(Continued)

*Primary Examiner* — Yong-Suk (Philip) Ro
(74) *Attorney, Agent, or Firm* — Maschoff Brennan

(57) ABSTRACT

A method of producing an umbilical includes providing an elongate flat metal strip, providing an elongate service carrier, encasing the service carrier in an insulation that is strain tolerant and high temperature tolerant, forming the metal strip into a tube shape around the insulated service carrier, and thereafter welding the edges of the metal strip to form a tube surrounding the insulated service carrier. The method may further comprise coiling the umbilical onto a spool. Such an umbilical may be useful for carrying fluids, power, control signals, or the like into a well.

16 Claims, 17 Drawing Sheets

(51) Int. Cl.
*E21B 17/20* (2006.01)
*E21B 43/24* (2006.01)
*E21B 23/14* (2006.01)
*F16L 9/17* (2006.01)
*E21B 43/12* (2006.01)
*E21B 36/04* (2006.01)
*H01B 7/04* (2006.01)

(56) References Cited

U.S. PATENT DOCUMENTS

| | | | |
|---|---|---|---|
| 3,643,741 | A | 2/1972 | Miranda |
| 3,653,215 | A | 4/1972 | Crucet |
| 3,658,181 | A | 4/1972 | Blair |
| 3,664,136 | A | 5/1972 | Laval et al. |
| 3,724,662 | A | 4/1973 | Ortiz |
| 3,745,773 | A | 7/1973 | Cunningham |
| 3,871,455 | A | 3/1975 | Hardy et al. |
| 3,879,951 | A | 4/1975 | Mason |
| 3,973,627 | A | 8/1976 | Hardy et al. |
| 3,981,154 | A | 9/1976 | Hix, Jr. |
| 4,004,635 | A | 1/1977 | Marquaire et al. |
| 4,269,639 | A | 5/1981 | Lewis |
| 4,284,943 | A | 8/1981 | Rowe |
| 4,290,714 | A | 9/1981 | Strange |
| 4,317,003 | A | 2/1982 | Gray |
| 4,318,442 | A | 3/1982 | Lunde et al. |
| 4,323,118 | A | 4/1982 | Bergmann |
| 4,324,505 | A | 4/1982 | Hammett |
| 4,338,970 | A | 7/1982 | Krackeler et al. |
| 4,358,218 | A | 11/1982 | Graham |
| 4,358,219 | A | 11/1982 | Burns |
| 4,382,716 | A | 5/1983 | Miller |
| 4,395,157 | A | 7/1983 | Cunningham |
| 4,416,565 | A | 11/1983 | Ostlund |
| 4,421,436 | A | 12/1983 | Burns |
| 4,440,523 | A | 4/1984 | Milgram |
| 4,449,850 | A | 5/1984 | Cessou et al. |
| 4,456,071 | A | 6/1984 | Milgram |
| 4,496,795 | A | 1/1985 | Konnik |
| 4,531,860 | A | 7/1985 | Barnett |
| 4,533,526 | A | 8/1985 | Delacour |
| 4,568,220 | A | 2/1986 | Hickey |
| 4,570,715 | A | 2/1986 | Van Meurs et al. |
| 4,572,299 | A | 2/1986 | VanEgmond et al. |
| 4,619,762 | A | 10/1986 | Delacour et al. |
| 4,622,116 | A | 11/1986 | Elton et al. |
| 4,643,612 | A | 2/1987 | Bergeron |
| 4,689,443 | A | 8/1987 | Bailleul |
| 4,702,832 | A | 10/1987 | Renfrow |
| 4,724,345 | A | 2/1988 | Elton et al. |
| 4,790,936 | A | 12/1988 | Renfrow |
| 4,822,434 | A | 4/1989 | Sawaki et al. |
| 4,930,454 | A * | 6/1990 | Latty et al. ............ 122/4 D |
| 4,956,535 | A | 9/1990 | Buelt et al. |
| 5,065,818 | A | 11/1991 | Van Egmond |
| 5,121,872 | A * | 6/1992 | Legget ................ 228/148 |
| 5,154,835 | A | 10/1992 | DeMichael |
| 5,172,765 | A | 12/1992 | Sas-Jaworsky et al. |
| 5,213,444 | A | 5/1993 | Henning |
| 5,560,536 | A * | 10/1996 | Moe ................ 228/102 |
| 5,658,473 | A | 8/1997 | Ziemek |
| 6,397,945 | B1 | 6/2002 | Manke et al. |
| 6,407,339 | B1 | 6/2002 | Rice et al. |
| 6,523,610 | B1 | 2/2003 | Griffith et al. |
| 6,540,018 | B1 | 4/2003 | Vinegar et al. |
| 6,759,592 | B1 | 7/2004 | Cai et al. |
| 6,761,574 | B1 * | 7/2004 | Song et al. ............ 439/320 |
| 6,769,485 | B2 | 8/2004 | Vinegar et al. |
| 6,777,965 | B1 | 8/2004 | Mess |
| 7,040,397 | B2 | 5/2006 | De Rouffignac et al. |
| 7,311,151 | B2 * | 12/2007 | Chitwood et al. ......... 166/367 |
| 7,892,597 | B2 | 2/2011 | Hooker et al. |
| 7,987,903 | B1 | 8/2011 | Prado Garcia |
| 8,016,030 | B1 | 9/2011 | Prado Garcia |
| 8,025,103 | B1 | 9/2011 | Wolinsky |
| 8,186,443 | B2 | 5/2012 | Wolinsky |
| 8,196,665 | B2 | 6/2012 | Wolinsky |
| 8,205,678 | B1 | 6/2012 | Milanovich |
| 8,297,361 | B1 | 10/2012 | Root |
| 8,322,437 | B2 | 12/2012 | Beynet et al. |
| 2001/0035764 | A1 | 11/2001 | Mess |
| 2002/0129945 | A1 | 9/2002 | Brewer et al. |
| 2002/0158064 | A1 | 10/2002 | Spencer |
| 2003/0037927 | A1 | 2/2003 | Dalrymple et al. |
| 2003/0124030 | A1 * | 7/2003 | Birdsall et al. ............ 422/105 |
| 2004/0065443 | A1 * | 4/2004 | Berg et al. ............ 166/380 |
| 2004/0134662 | A1 | 7/2004 | Chitwood et al. |
| 2004/0144541 | A1 | 7/2004 | Picha et al. |
| 2005/0006097 | A1 | 1/2005 | Sandberg et al. |
| 2005/0029476 | A1 * | 2/2005 | Biester et al. ............ 251/58 |
| 2005/0092483 | A1 | 5/2005 | Vinegar et al. |
| 2005/0179152 | A1 | 8/2005 | Bauer et al. |
| 2007/0181306 | A1 | 8/2007 | Tupper et al. |
| 2007/0199709 | A1 | 8/2007 | Hooker et al. |
| 2010/0051279 | A1 | 3/2010 | Baugh et al. |
| 2011/0274496 | A1 | 11/2011 | Dvorak |
| 2011/0293372 | A1 | 12/2011 | Later |
| 2012/0125623 | A1 | 5/2012 | Cargol et al. |
| 2012/0247784 | A1 | 10/2012 | Lacy |
| 2012/0325489 | A1 | 12/2012 | Beynet et al. |
| 2013/0046126 | A1 | 2/2013 | Varney et al. |

OTHER PUBLICATIONS

Author Unknown, "Mineral Insulated Heating Cables," Tyco Thermal Controls, Jan. 2005, 16 pages.
Author Unknown, "Appendix J: Engineering Specification for Electrical Heat-Tracing Systems," Tyco Thermal Controls, Aug. 2003, 11 pages.
Author Unknown, "Editorial: Oil shale's potential looms large, later," DenverPost.com, 2 pages, No date.
Author Unknown, "Editorial: Riding the coattails of Katrina," DenverPost.com, [retrieved Oct. 3, 2005], 1 page. Retrieved from: http://www.denverpost.com/portlet/article/html/fragments/print_article.jsp?article=3084166.
Author Unknown, "Legislators hope Senate will alter oil shale proposal," Associated Press, Oct. 27, 2005, [retrieved on Nov. 4, 2005], 1 page. Retrieved from: http://www.dailycamera.com/bdc/state_news/article/0,1713,BDC_2419_4190279,00.html.
Author Unknown, "MI Heating Cable—Alloy 825," Tyco Thermal Controls, Jan. 2005, 5 pages.
Author Unknown, "Mineral Insulated Cables," Tyco Thermal Controls, no date, 2 pages.
Author Unknown, "Oil shale:more trouble than worth?" Associated Press, Oct. 5, 2005, [retrieved on Nov. 4, 2005], 2 pages. Retrieved from: http://www.dailycamera.com/bdc/national_intl_business/article/0,1713,BDC_2464_4132585,00.html.
Author Unknown, "Shell takes next step in oil shale testing project," Associated Press, Aug. 20, 2005, [retrieved on Nov. 4, 2005], 1 page. Retrieved from: http://www.dailycamera.com/bdc/national_intl_business/article/0,1713,BDC_2464_4015764,00.html.
Bartis, J., et al., "Summary," *Oil Shale Development in the United States*, RAND Infrastructure, Safety, and Environment, RAND Corporation, 2005, 10 pages.
Bunger, J., "Exploration of oil shale needs federal prodding," no date, 1 page.
Chakrabarty, G., "Betting on Shale," Rocky Mountain News, no date, 2 pages.
Chakrabarty, G., "Shale's new hope," Rocky Mountain News, Oct. 18, 2004, 2 pages.
Cooke, S., "Defense official: US could be new energy center," Associated Press, Oct. 19, 2005, [retrieved on Nov. 4, 2005], 1 page. Retrieved from: http://www.dailycamera.com/bdc/state_news/article/0,1713,BDC_2419_4172329,00.html.
Denning, D., "Stinky Water, Sweet Oil . . . The Last Word," 2 pages, No date.
Fabian, P., et al., "Electrical Insulation Systems for the ITER Central Solenoid Model Coil", IEEE Transactions on Applied Superconductivity, 1999, vol. 9, No. 2, pp. 632-635.

(56) References Cited

OTHER PUBLICATIONS

Foy, P., "Oil riches just out of reach," DenverPost.com, no date, 4 pages.
Fumento, M., "Guzzle away! Oil sands will save us," Scripps Howard News Service, Oct. 29, 2005, [retrieved on Nov. 4, 2005], 2 pages. Retrieved from: http://www.dailycamera.com/bdc/opinion_columnists/article/0,1713,BDC_2490_4195580,00.html.
Gartner, E., "Industry scrounging for labor," Associated Press, Oct. 7, 2005, [retrieved on Nov. 4, 2005], 2 pages. Retrieved from: http://www.dailycamera.com/bdc/national_intl_business/article/0,1713,BDC_2464_4138778,00.html.
International Search Report and Written Opinion of PCT/US2007/003404 mailed on Sep. 26, 2007, 7 pages.
International Search Report and Written Opinion of PCT/US2011/043072 mailed on Nov. 1, 2011, 10 pages.
Jayakumar, et al., "Testing of ITER Central Solenoid Coil Insulation in an Array", *16th IEEE/NPSS Symposium on Fusion Engineering*, vol. 2, 1995, pp. 1502-1505.
Johnson, H., et al., "Strategic Significance of America's Oil Shale Resource—vol. II," AOC Petroleum Support Service, LLC, Washington, D.C., Mar. 2004, 57 pages.
Kohler, J., "Oil extraction at what price," Associated Press, Oct. 8, 2005, [retrieved on Nov. 4, 2005], 2pages. Retrieved from: http://www.dailycamera.com/bdc/national_intl_business/article/0,1713,BDC_2464_4142034,00.html.
Lofholm, N., "Coal-mine rail sought at Mesa-Garfield line," Denver Post.com, 2 pages, No Date.
Reed, R., et al., "Development of U.S./ITER CS Model Coil Turn Insulation", *Advances in Cryogenic Engineering (Materials)*, vol. 44, Plenum Press, NY, 1998, pp. 175-182.
Soraghan, M., "Bill aims to waive energy rules," DenverPost.com, no date, 2 pages.
Soraghan, M., "Companies seek oil-shale leases," DenverPost.com, no date, 1 page.
Talhelm, J., "Study touts oil shale," Associated Press, Sep. 1, 2005, [retrieved on Nov. 4, 2005], 1 page. Retrieved from: http://www.dailycamera.com/bdc/state_news/article/0,1713,BDC_2419_4045570,00.html.
Talhelm, J., "Canada's tar sands: 'Smell like money'," Associated Press, Oct. 6, 2005, [Retrieved on Nov. 4, 2005], 2 pages. Retrieved from: http://www.dailycamera.com/bdc/tech_plus/article/0,1713,BDC_2463_4135636,00.html.
Talhelm, J., "Caution urged with oil shale," Associated Press, no date, 1 page.
Trefny, J., "Energy act is a step in the right direction," DenverPost.com, no date, 2 pages.
Udall, R., "The Illusive Bonanza: Oil Shale in Colorado, "Pulling the Sword from the Stone"," no date, 5 pages.
International Search Report and Written Opinion of PCT/US12/38364 mailed on Jul. 30, 2012, 9 pages.

* cited by examiner

COILED UMBILICAL TUBING

CROSS-REFERENCE TO RELATED APPLICATIONS

This application claims priority to Provisional U.S. Patent Application No. 61/362,153 filed Jul. 7, 2010, titled "COILED UMBILICAL TUBING" and Provisional U.S. Patent Application No. 61/488,083 filed May 19, 2011, titled "THERMAL HYDRATE PREVENTER." The entire disclosure of both of the aforementioned Provisional U.S. Patent Applications are hereby incorporated by reference, for all purposes, as if fully set forth herein.

BACKGROUND OF THE INVENTION

In a well servicing or production environment, it is often desirable to provide various services within a well. For example, it may be beneficial to heat some or all of the well string or a portion of the formation in which the well is drilled, in order to facilitate oil or other mineral extraction, to prevent the precipitation or hardening of drilling byproducts, or for other purposes. Or it may be desired to provide sensors or other devices downhole, and to provide electrical power required to operate the devices. In some applications, fluids may be introduced downhole. Well services may be provided by the use of an umbilical. An umbilical is an elongate line or tube that carries electrical power, fluid, control signals, or other services or combinations of services.

BRIEF SUMMARY OF THE INVENTION

Embodiments of the invention enable the production of umbilicals in very long lengths encased in coiled tubing. For example, a service carrier may be encased in a heat tolerant and strain tolerant insulation, and then encased in metal tubing formed around the service carrier and welded. The umbilical may then be coiled onto a spool. The heat tolerant and strain tolerant insulation enables welding of the metal tubing, so that long lengths of service carrier need not be inserted into a completed tube.

According to some embodiments, a method of producing an umbilical includes providing an elongate flat metal strip, providing an elongate service carrier, encasing the service carrier in an insulation that is strain tolerant and high temperature tolerant, forming the metal strip into a tube shape (circular or non-circular) around the insulated service carrier, and thereafter welding the edges of the metal strip to form a tube surrounding the insulated service carrier. In some embodiments, the method may further include coiling the umbilical onto a spool. The service carrier may comprise a power conductor. The service carrier may comprise a tube for carrying fluid. The service carrier may comprise an electrical cable. The service carrier may comprise a fiber optic. The service carrier may comprise a resistive, radio frequency, or inductive electric heater electric heater.

In some embodiments, encasing the service carrier in an insulation that is strain tolerant and high temperature tolerant comprises encasing the service carrier in an insulation formed of an inorganic polymer (e.g., a green-state ceramic material, etc.). The method may further include embedding the insulated service carrier in a fill material. Embedding the insulated service carrier in a fill material may further include wrapping the insulated service carrier in a fiberglass mat. Other possible fill materials include any woven or non-woven fiber that can withstand the high temperatures used in operation or processing of the coiled umbilical such as woven or non-woven ceramic fibers, flexible inorganic porous or foam materials, or a high temperature thermoplastic material such as Polyether Ether Ketone (PEEK) or other similar flouropolymers.

In some embodiments the method may include providing multiple elongate service carriers, encasing one or more of the multiple elongate service carriers in the insulation, forming the metal strip into a tube shape around the multiple elongate service carriers, and thereafter welding the edges of the metal strip to form a tube surrounding the multiple elongate service carriers. The multiple elongate service carriers may comprise one or more of a power conductor, a tube for carrying fluid, an electrical cable, and/or a fiber optic, alone or in any combination.

According to other embodiments, an umbilical comprises an elongate service carrier, a layer of insulation encasing the elongate service carrier, and a welded metal tube surrounding the insulated service carrier. The insulation is both sufficiently strain tolerant to permit the finished umbilical to be wrapped onto a spool without substantially diminishing the performance of the insulation layer, and sufficiently high temperature tolerant to permit welding of the metal tube around the insulated service carrier. The welded metal tube may comprise a circular or non-circular configuration. The service carrier may comprise a power conductor. The service carrier may comprise a tube for carrying fluid. The service carrier may comprise an electrical cable. The service carrier may comprise a fiber optic and sensors. The umbilical may further comprise a fill material surrounding the insulated service carrier within the welded metal tube. The fill material may comprise a fiberglass mat.

The umbilical may comprise multiple elongate service carriers and at least one of the multiple elongate service carriers may be encased in the insulation. The welded metal tube may surround the multiple elongate service carriers. The multiple elongate service carriers may comprise one or more of a power conductor, a tube for containing fluid, an electrical cable, and/or a fiber optic, alone or in any combination.

According to other embodiments, a method of deploying an umbilical into a well comprises providing an umbilical that includes an elongate service carrier, a layer of insulation encasing the elongate service carrier, and a welded metal tube surrounding the insulated service carrier. The insulation is both sufficiently strain tolerant to permit the finished umbilical to be wrapped onto a spool without substantially diminishing the performance of the insulation layer, and sufficiently high temperature tolerant to permit welding of the metal tube around the insulated service carrier. The method further includes uncoiling the umbilical from a spool, and inserting the umbilical into the well, a pipe, or a mine shaft.

The umbilical may be rotated about a longitudinal axis to facilitate insertion of the umbilical within the well, pipe, or mineshaft, or extraction of the umbilical therefrom. Instead of or in addition to inserting the umbilical into the well, pipe, or mine shaft, the umbilical may be deployed along a surface from a first location toward a second location so as to provide one or more functionalities, such as electricity, power, fluid transportation, networking, communication, and the like. In some embodiments, the surface may include an offshore oil rig or the sea floor, although other surfaces are contemplated.

According to other embodiments, an umbilical may include an elongate welded metal tube configured for insertion into downhole wells where the elongate welded metal tube includes a first longitudinal section that encases a first service carrier that provides a first functionality and a second longitudinal section that encases a second service carrier that provides a second functionality different than the first functionality. A connector may couple the first longitudinal section and the second longitudinal section. The connector may include a port that provides fluid communication between the interior of the elongated welded metal tube and the interior of the well and/or the connector may include a sensor that monitors one or more conditions of the umbilical or the downhole well. The first longitudinal section and the second longitudinal section may be separate elongate welded tubes.

The first longitudinal section may be pressurizable to a first pressure and the second longitudinal section may be pressurizable to a second pressure different than the first pressure so that the pressure within the umbilical is variable longitudinally (i.e., along the longitudinal length of the umbilical). A cross sectional shape and/or a cross sectional size of the first longitudinal section may be different than the second longitudinal section and the wall thickness of the elongate welded metal tube may vary along the longitudinal length of the umbilical. The umbilical may further include a third longitudinal section disposed between the first longitudinal section and the second longitudinal section. The third longitudinal section may encase a third service carrier that provides a third functionality different than both the first functionality and the second functionality.

The first functionality and/or the second functionality may include a power conductor; a tube for carrying fluid; an electric heater; an electric cable; a pump; a sensor cable including fiber optic; a radio frequency antenna, and the like. A fluid carried in the tube may include a diluent that is introduced into the downhole well to discourage the formation of one or more precipitants or a fluid that is extracted from the downhole well. The diluent may be heated within the umbilical prior to being introduced into the downhole well. The umbilical may be flexible so as to be wound onto a spool.

The umbilical may further include a plurality of sensors spaced longitudinally along the elongate welded metal tube. The plurality of sensors may provide information about one or more conditions of the umbilical or the downhole well. The umbilical may also include a pump coupled with the elongate welded metal tube at or substantially near a distal end of the elongate welded metal tube. The rigidity of the elongate welded metal tube may allow the pump to be pushed through one or more vertical or horizontal sections of the downhole well. The first longitudinal section and/or the second longitudinal section may be rotatable about their respective longitudinal axis to facilitate insertion or extraction of the umbilical from the downhole well. The first longitudinal section and/or the second longitudinal section may be rotated by varying a fluid flow within the elongate welded metal tube or varying a fluid flow external to the elongate welded metal tube. The first longitudinal section and/or the second longitudinal section may include external fins or internal guides that facilitate in rotating the respective longitudinal section as the internal or external fluid flow is varied.

According to other embodiments, an umbilical may include a welded metal tube having an inner surface, an outer surface, and a longitudinal length. The umbilical may also include an internal support coupled with opposite sides of the inner surface and extending along at least a portion of the longitudinal length. The internal support may separate a first conduit and a second conduit. The umbilical may further include a first service carrier disposed within the first conduit. The first service carrier may provide a first functionality. The umbilical may additionally include a second service carrier disposed within the second conduit. The second service carrier may provide a second functionality different than the first functionality. The umbilical may be wrapped onto a spool for deployment.

The first and/or second functionalities may consist of one or more of: a power conductor, a tube for carrying fluid, an electric heater, an electric cable, a pump, a fiber optic, and the like. A cross section of the umbilical may comprise an oval or elliptical shape. The internal support may include a lumen that extends along the length of the internal support and one or more cables may be inserted through the lumen of the internal support.

DETAILED DESCRIPTION OF THE INVENTION

As well drilling technology advances, wells may be drilled at ever-increasing depths and horizontal distances. A well may now extend for as much as 50,000 feet or more, including vertical, angled, and horizontal sections. To reach the extremes of a well, an umbilical may be pushed from the surface. Accordingly, it is desirable that the umbilical be flexible enough to adapt to directional changes in the wellbore, but stiff enough to be pushed into the well.

In accordance with embodiments of the invention, an umbilical may be encased in coiled tubing. Coiled tubing is used for various purposes in the drilling field, and is any continuously-milled tubular product manufactured in lengths that require spooling onto a take-up reel or spool during manufacturing. Coiled tubing may be transported to a wellsite in its coiled state, and at least partially straightened before being inserted into a well. Upon removal from the well, the coiled tubing may be wound back onto a spool. Most coiled tubing is made of metal, for example low-alloy carbon steel, although other metals and composites have been used.

Previous techniques for making umbilicals using coiled tubing have started with completed tubing and inserted service carrying lines into the tubing. The difficulty of inserting wiring, other tubing, or other service carriers into closed tubing limited the length of umbilical that could be produced. For the purposes of this disclosure, a service carrier is any elongate member used to carry power, fluids, signals, electrical energy, or another service or combination of services within an umbilical. Examples of service carriers include conductive wires or rods used to heat a well (electric heaters), cables used to carry signals to downhole equipment, electrical conductors used to carry electrical power to downhole equipment, fiber optics, and tubes used to carry fluids downhole. Other kinds of service carriers may be envisioned.

Embodiments of the invention enable the fabrication of umbilicals clad in coiled tubing of nearly any length.

Figure 1:
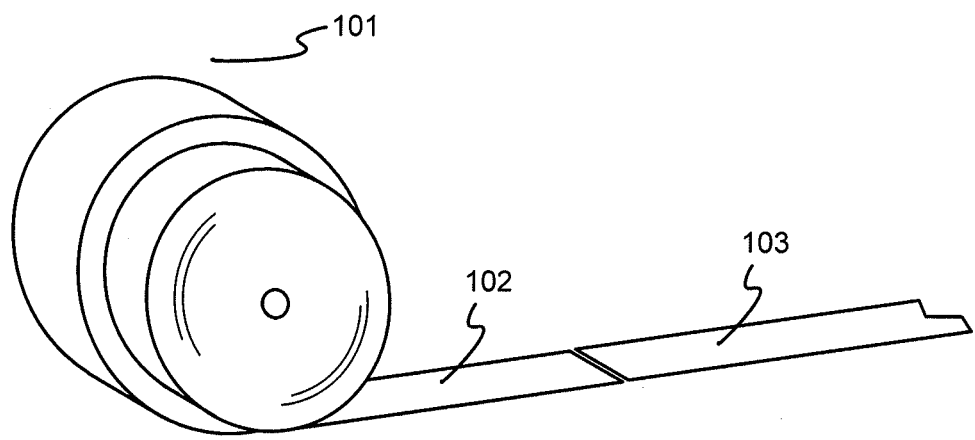
FIG. 1 illustrates a step in a process of making an umbilical, in accordance with embodiments of the invention.

FIG. 1 illustrates a step in a process of making an umbilical, in accordance with embodiments of the invention. A coil 101 of sheet metal is provided, and a strip 102 is cut from coil 101. The width of strip 101 is selected based on the desired diameter of the completed umbilical. Multiple strips may be cut from coil 101. If necessary, strip 102 may be bias welded to one or more additional strips such as strip 103, to form a single continuous metal member of the desired length of the eventual umbilical. Bias welds may be made so that the mechanical properties of the finished welds are very similar to the properties of the metal strip.

Figure 2:
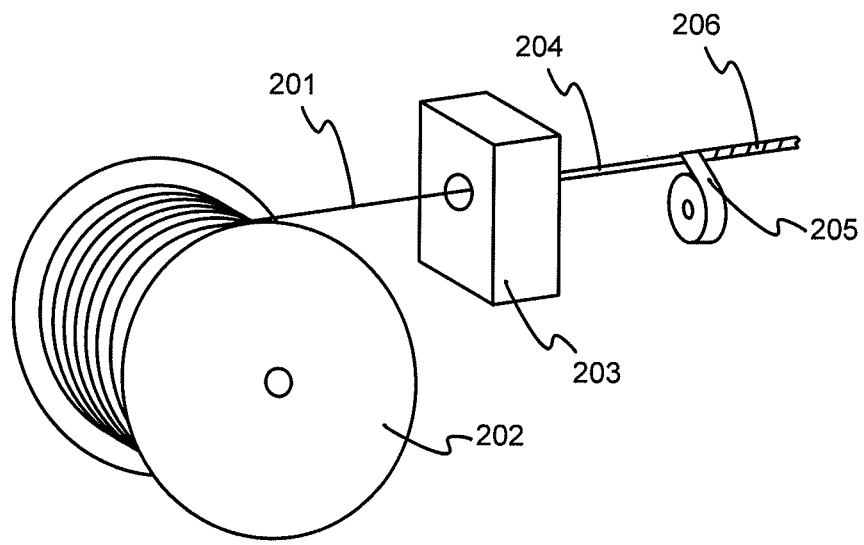
FIG. 2 illustrates another step in a process of making an umbilical, in accordance with embodiments of the invention.

In another operation, a service carrier is encased in an insulation that is both high temperature tolerant and strain tolerant. FIG. 2 illustrates a conductor 201 being taken off of a spool 202 and coated with insulation by coater 203. Any suitable insulation may be used. Here, to be high temperature tolerant means that the casing of the eventual umbilical may be welded and/or heat treated (e.g., annealed) without significantly degrading the dielectric properties of the insulation. In embodiments the dielectric properties of the insulation may not be degraded measurably by welding on the casing, may be diminished by less than five percent, may be diminished by less than 10 percent, or may be diminished by less than 25 percent. To be strain tolerant means that the eventual umbilical can be wrapped onto spool without substantially diminishing the performance of the insulation layer. In embodiments the dielectric properties of the insulation may not be degraded measurably by wrapping of the umbilical on a spool, may be diminished by less than five percent, may be diminished by less than 10 percent, or may be diminished by less than 25 percent. In some embodiments, the insulation may be an inorganic polymer (e.g., a polymer with a skeletal structure that does not include carbon atoms, such as a green-state ceramic material, silicone rubber, etc.). One example of a suitable insulation is NANUQ® insulation available from Composite Technology Development, Inc., of Lafayette, Colo., USA. The insulation may comprise a non-flammable fire retardant material and may be explosion proof In some embodiments, the insulation may be placed onto conductor 201 or another service carrier by wrapping the service carrier in a sleeve of glass or ceramic tape that has been impregnated with a preceramic resin, and then heating the resin to form a green-state ceramic. More detail about the application of insulation used in some embodiments may be found in U.S. Pat. No. 6,407,339 of Rice et al., issued Jun. 18, 2002 and titled "Ceramic Electrical Insulation for Electrical Coils, Transformers, and Magnets, and in pending U.S. patent application Ser. No. 11/351,654 of Hooker et al., filed Feb. 9, 2006 and titled "In Situ Processing of High-Temperature Electrical Insulation", the disclosures of which are hereby incorporated in their entirety herein for all purposes.

In some embodiments, coated service carrier 204 may be further embedded in a fill material that can also withstand high temperatures and bending. In some embodiments, the fill material may be a woven or nonwoven fiberglass mat, and may be wrapped over coated service carrier 204 to form a wrapped service carrier 206, as is illustrated in FIG. 2. Other materials for the fill material include any woven or non-woven fiber that can withstand the high temperatures used in operation or processing of the coiled umbilical such as woven or non-woven ceramic fibers, flexible inorganic porous or foam materials, or a high temperature thermoplastic material such as Polyether Ether Ketone (PEEK) or other similar flouropolymers.

Figure 3:
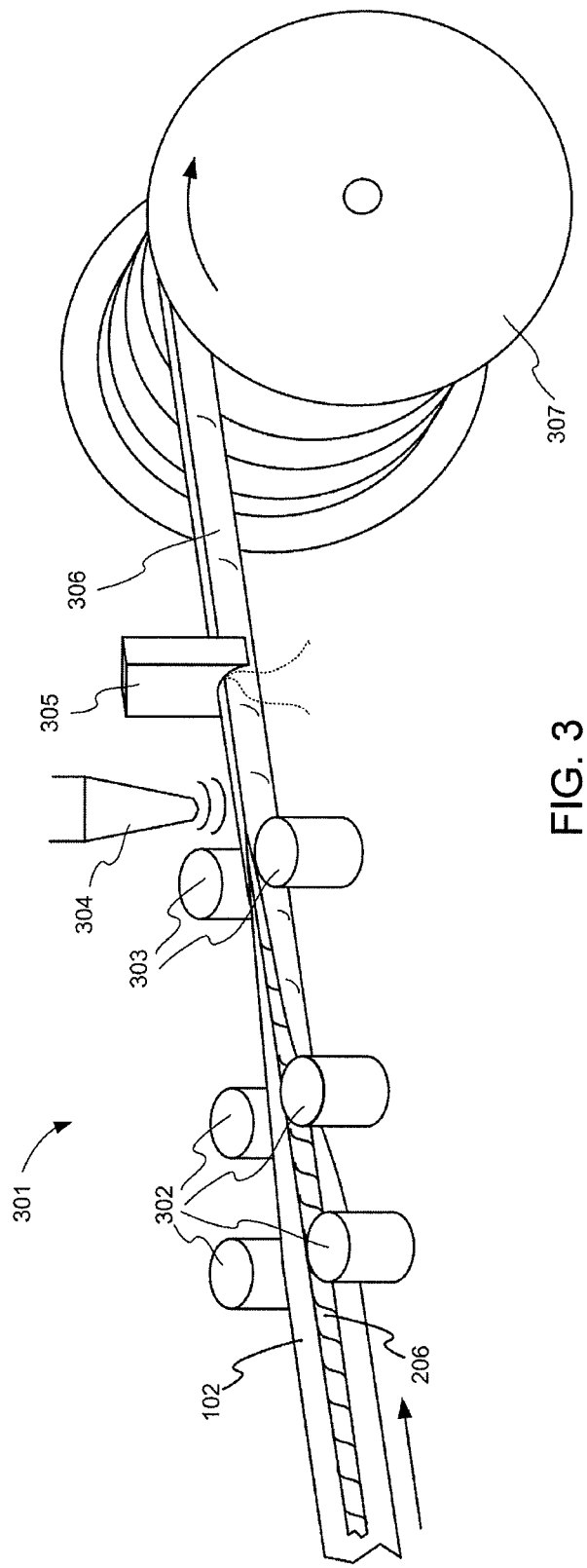
FIG. 3 illustrates the formation of an umbilical encased in coiled tubing, in accordance with embodiments of the invention.

FIG. 3 illustrates the formation of an umbilical encased in coiled tubing, in accordance with embodiments of the invention. Service carrier 206, which is encased in insulation and in this example is further embedded in a fill material, is aligned with metal strip 102 and passed to a mill 301. Within mill 301, a series of rollers 302 gradually forms strip 102 into a tube shape around service carrier 206. The tube shape may be circular or non-circular, including oval, elliptical, square, rectangular, and the like. A final set of rollers 303 may force the edges of strip 102 together, and a welder 304 welds the edges of the metal strip together to form a closed tube around service carrier 206. Welder 304 may be, for example, a high frequency induction welding machine that fuses the edges with a continuous longitudinal seam. Portions of the metal tube may reach temperatures of about 1650° F. (900° C.) during the welding process. In induction welding, no fill material is used, and a small bead may be formed on both the inside and the outside of the resulting tube. A scarfing tool 305 may remove the external bead.

Other finishing treatments may be applied. For example, the weld seam may be normalized or annealed using highly localized induction heating, for example by raising the seam to about 1350° F. (730° C.) after the bead has been scarfed away. The seam may be allowed to cool and may be further cooled with water or another fluid. The seam may be inspected, and the tube may be passed through sizing rollers that further refine the shape and size of the tubing. A stress relief operation may also be performed at any convenient stage in the manufacturing process. The fill material may also be helpful to protect the service carrier or carriers within the umbilical during these later processing steps, such as the shape refining process.

Completed umbilical 306 is then coiled onto a spool 307 for storage and transportation. Because the materials used in making umbilical 306 can withstand high temperatures and bending, umbilical 306 can be coiled onto spool 307 and later uncoiled for use while substantially maintaining the performance of its insulation. Inspection of umbilical 306 may be performed before or after coiling onto spool 307, or both.

Umbilical 306 is sufficiently stiff to be inserted into a deep well, and is sufficiently flexible and durable to be coiled onto spool 307 and to accommodate directional changes in a well into which umbilical 306 may be inserted. The metal tubing forming the outside of umbilical 306 provides excellent resistance to the hostile environments that may be encountered in a well or other location where umbilical 306 may be used.

Figure 4A:
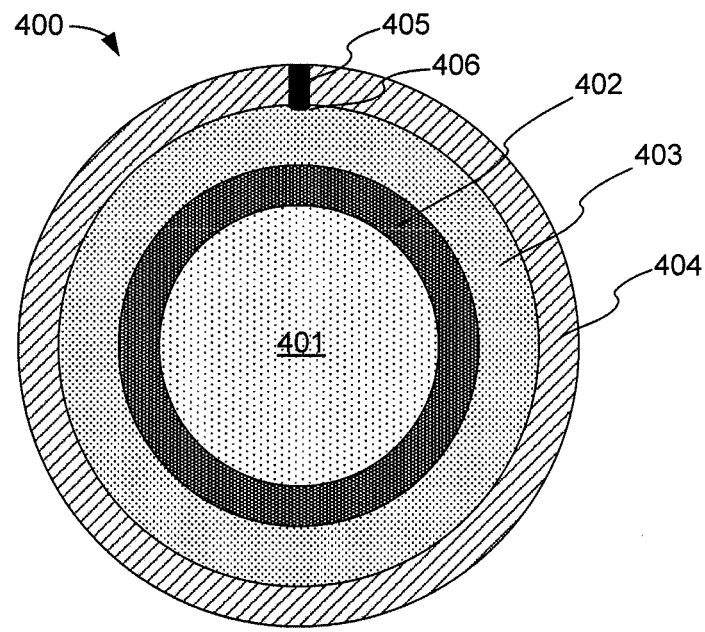
FIG. 4A illustrates a cross section view of an umbilical in accordance with some embodiments.

FIG. 4A illustrates a cross section view of an umbilical 400 in accordance with some embodiments. Umbilical 400 may be suitable, for example, for use as a resistance heater for heating a well formation. Heating of a well formation may be done to reduce the viscosity of oil, to remove wax or other impediments to flow, or for other reasons. A conductor 401 may be, for example, a copper wire or rod having a diameter up to 0.5 inches (12.7 mm) or more. A layer of high temperature tolerant and strain tolerant electrical insulation 402 encases conductor 401. Insulation 402 may be, for example, about 0.05 inches (1.27 mm) thick. Conductor 401 and insulation 402 are further encased in a layer of fill material 403. Conductor 401, insulation 402, and fill material 403 are further surrounded by metal tubing 404. Metal tubing 404 may, for example, have an outside diameter of about 1.00 inches (25.4 mm) and a wall thickness of about 0.09 inches (2.28 mm). The edges of the sheet that formed metal tubing 404 are joined by a weld 405, and a small bead 406 is visible at the inner surface of metal tubing 404.

Figure 4B:
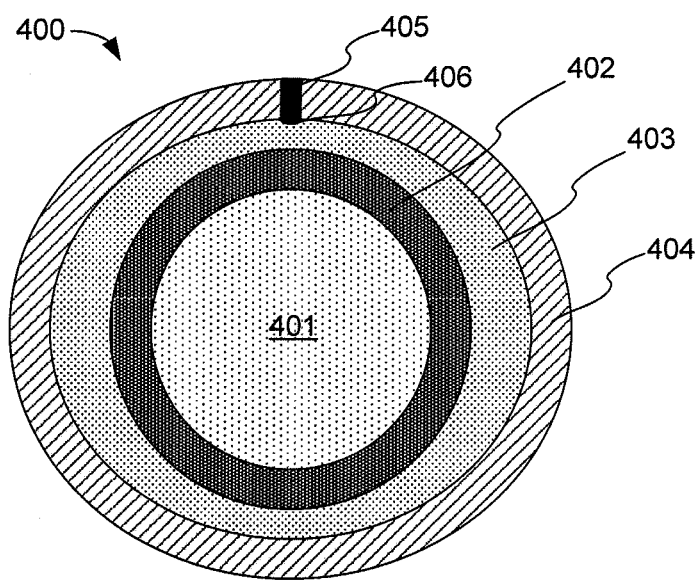
FIG. 4B illustrates a cross section view of the umbilical of FIG. 4A as it may appear after being coiled on a spool.

FIG. 4B illustrates a cross section view of umbilical 400 as it may appear after umbilical 400 has been coiled on a spool such as spool 307. During the coiling process, metal tubing 404 may distort into an oblate shape similar to an ellipse. Fill material 403 may assist in accommodating this distortion, and in protecting insulation 402. For compactness, umbilical 400 may be coiled onto a spool of small enough diameter that metal tubing 404 yields in the coiling process.

Figure 5:
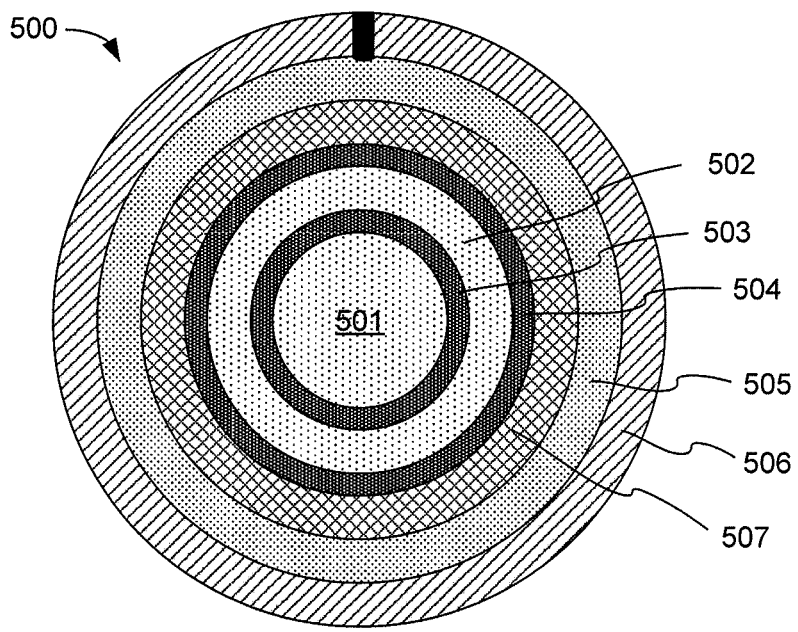
FIG. 5 illustrates a cross section view of an umbilical in accordance with other embodiments.

FIG. 5 illustrates a cross section view of an umbilical 500 in accordance with other embodiments. Umbilical 500 may be useful, for example, for transmitting electrical power downhole. Umbilical 500 includes first and second conductors 501 and 502, configured coaxially. A toroidal first layer of high temperature tolerant and strain tolerant insulation 503 is positioned between first and second conductors 501 and 502, and a second layer of high temperature tolerant and strain tolerant insulation 504 surrounds second conductor 502. Insulated conductors 501 and 502 may be further embedded by fill material 505, and surrounded by metal tubing 506. As is shown in FIG. 5, embodiments may include other layers, for example an additional spacing layer 507, which may be an additional layer of fill material, a foam material in which other components are encased, or another kind of layer. Umbilicals in accordance with embodiments of the invention may be used to carry alternating current (AC) power or direct current (DC) power. In some embodiments, the outer metal tubing of an umbilical may be utilized as part of an electrical circuit.

Figure 6:
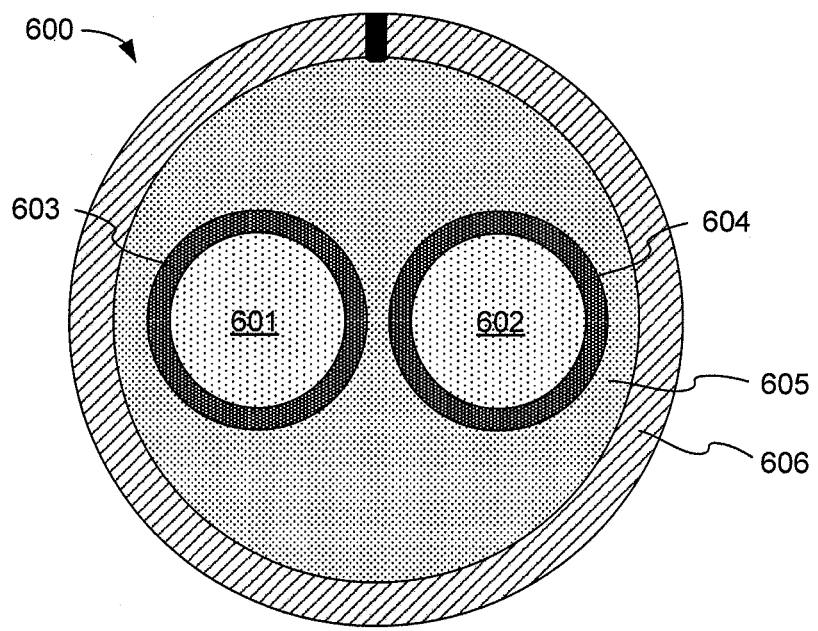
FIG. 6 illustrates a cross section view of an umbilical in accordance with other embodiments.

FIG. 6 illustrates a cross section view of an umbilical 600 in accordance with other embodiments. Exemplary umbilical 600 may also be useful for transmitting electrical power downhole. Umbilical 600 includes first and second conductors 601 and 602. First conductor 601 is encased by a first layer of high temperature tolerant and strain tolerant insulation 603, and second conductor 602 is encased by a second layer of high temperature tolerant and strain tolerant insulation 604. Both insulated conductors 601 and 602 may be embedded in a fill material 605, and surrounded by metal tubing 606. One or more additional conductors could be provided in an umbilical similar to umbilical 600. For example, an umbilical having three conductors could be used to transmit three-phase power downhole, for heating or other purposes.

Figure 7:
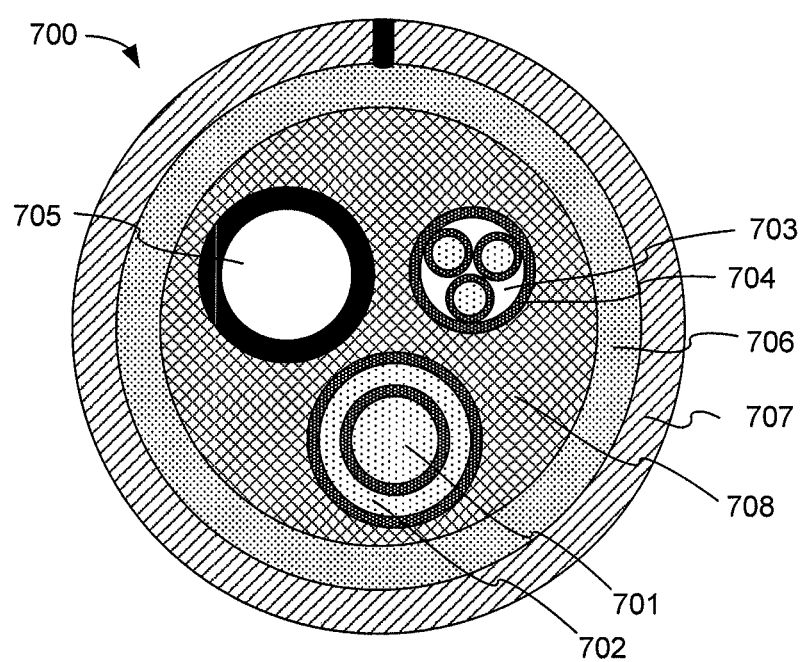
FIG. 7 illustrates a cross section view of an umbilical in accordance with still other embodiments.

FIG. 7 illustrates a cross section view of an umbilical 700 in accordance with other embodiments. Exemplary umbilical 700 includes several different kinds of service carriers, and may be useful, for example, for monitoring and powering downhole equipment during a well servicing operation. Umbilical 700 includes two electrical conductors 701 and 702, which may be configured coaxially and insulated in a way similar to the configuration of conductors 501 and 502 in umbilical 500 shown in FIG. 5. The two conductors could also be separately provided, as in umbilical 600 shown in FIG. 6. Additional conductors may also be present. Umbilical 700 further includes an electrical cable 703 for carrying electrical signals and power to downhole instrumentation and the like. Electrical cable 703 may also be encased in high temperature tolerant and strain tolerant insulation 704. While electrical cable 703 is illustrated as having three conductors, cables with more or fewer conductors may be used. Umbilical 700 further includes a fluid tube 705, which may be useful for carrying solvents or other fluids down the well. Depending on the material fluid tube 705 is made of, fluid tube 705 may also be encased in high temperature tolerant and strain tolerant insulation. If fluid tube 705 is a metal tube, such insulation may not be needed. The various service carriers of umbilical 700 may be further embedded in a fill material 706, and are then surrounded by metal tubing 707. An additional spacing material 708 may be provided.

Other kinds of service carriers could be included in an umbilical, separately or in combination with other service carriers. For example, fiber optic sensors and cabling may be included, and may provide sensor measurements at different locations within the well using a single fiber optic. Such measurements may include temperature measurements, for example. Fiber optics may also be used to carry high speed or high data rate signals, such as video or images from other imaging techniques.

Umbilicals according to embodiments of the invention may have a number of advantages over previous umbilicals. The service carriers present in umbilicals according to embodiments of the invention are encased in metal tubing, and are thus well protected against hostile environments and mechanical damage. An umbilical may be provided in any of a variety of diameters. For example, equipment is available for handling coiled tubing in diameters ranging up to at least 4.5 inches. The process described above can produce an umbilical of nearly any length, but the logistics of shipping and handling of large spools may limit the length of umbilical that can be transported to a wellsite. Accordingly, umbilicals according to embodiments of the invention may be spliced at the wellsite if needed.

In one particular application of splicing, an umbilical may be configured to a particular well. For example, if it is desired to heat the well formation within a particular range of depths, an umbilical may be prepared that provides one or more low-resistance power conductors in the upper portion of the well once deployed, and provides a resistance heating element in the range of depths where heating is desired. In this way, power supplied to the umbilical goes mainly toward generating heat at the depth of interest, and little power is wasted in heating the upper portion of the well formation.

Figure 8A:
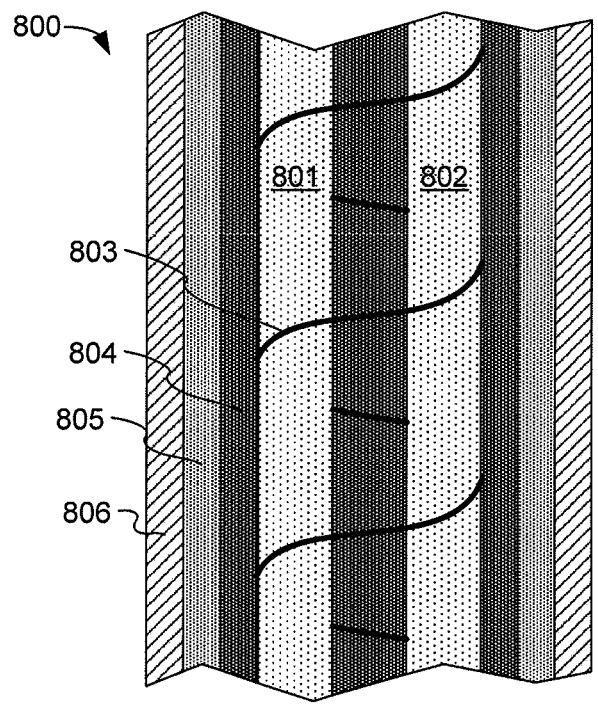
FIG. 8A illustrates a longitudinal cutaway view of an umbilical in accordance with other embodiments of the invention.

FIG. 8A illustrates a longitudinal cutaway view of an umbilical 800, in accordance with other embodiments of the invention. Umbilical 800 includes two conductors 801 and 802. A resistive element 803 periodically contacts both conductors. For example, resistive element 803 may be a nichrome wire wrapped in a spiral configuration about conductors 801 and 802. When a voltage is applied to conductors 801 and 802, resistive element 803 conducts a limited amount of current between conductors 801 and 802, providing resistance heating. The heat generated is a function of the resistance of resistive element 803, the voltage applied to conductors 801 and 802, and the spacing of the contact points between resistive element 803 and conductors 801 and 802, among other variables. Conductors 801 and 802 and resistive element 803 thus form a service carrier that is a resistive heater, and that may also supply power to downhole equipment. Conductors 801 and 802 and resistive element 803 may be encased in high temperature tolerant and strain tolerant insulation 804, which may be further embedded in a fill material 805. Metal tubing 806 surrounds the other components of umbilical 800. An umbilical such as umbilical 800 could be spliced with another umbilical similar to umbilical 600 shown in FIG. 6, to provide heating to only a particular part of a well. The amount of heat supplied may be varied along the length of umbilical 800 by varying the spacing between points where resistive element 803 contacts conductors 801 and 802, for example by varying the pitch of the spiral wrapping of resistive element 803 around conductors 801 and 802. Construction of an umbilical such as umbilical 800 is greatly facilitated by the production process illustrated in FIG. 3, wherein metal tubing 806 is formed around the other parts of umbilical 800, without having to insert components into an end of metal tubing 806.

An umbilical such as umbilical 800 having a parallel heating circuit may provide uniform heating along its length, and may be cut to length for a particular application. The uniform heating rate may be managed by adjusting the current applied to the heater, at a given voltage, as a function of the heater length. Heaters of different heat ratings or voltage ratings could be spliced together to provide a custom and varying heater capability for particular well conditions.

Figure 8B:
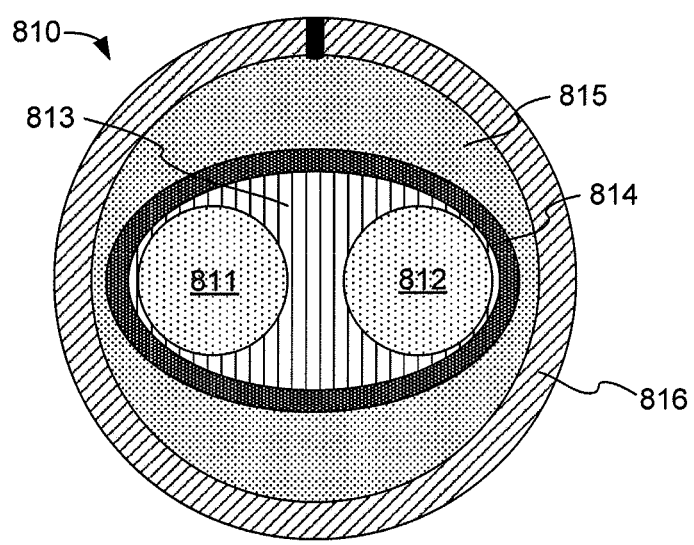
FIG. 8B illustrates a cross section view of an umbilical in accordance with other embodiments of the invention.

FIG. 8B illustrates a cross section view of an umbilical 810, in accordance with other embodiments of the invention. Umbilical 810 may also be used as a heating element, but is formed in a different way than umbilical 800. Umbilical 810 includes two conductors 811 and 812, which are embedded in or otherwise connected by a semiconductive medium 813. Semiconductive medium 813 has a bulk resistance that permits a limited amount of current to flow between conductors 811 and 812 when a voltage is applied between conductors 811 and 812, and may be, for example, a polymer-based medium. As current flows, semiconductive medium 813 may heat up due to ohmic heating. Conductors 811 and 812 and semiconductive medium 813 thus form a service carrier that is a resistive heater, and that may also supply power to downhole equipment. Conductors 811 and 812 and semiconductive medium 813 may be encased in high temperature tolerant and strain tolerant insulation 814, which may be further embedded in fill material 815. Metal tubing 816 surrounds the other components of umbilical 810. An umbilical such as umbilical 810 could be spliced with another umbilical similar to umbilical 600 shown in FIG. 6, to provide heating to only a particular part of a well.

Umbilicals according to embodiments of the invention may find a variety of uses in addition to those already discussed.

Figure 9:
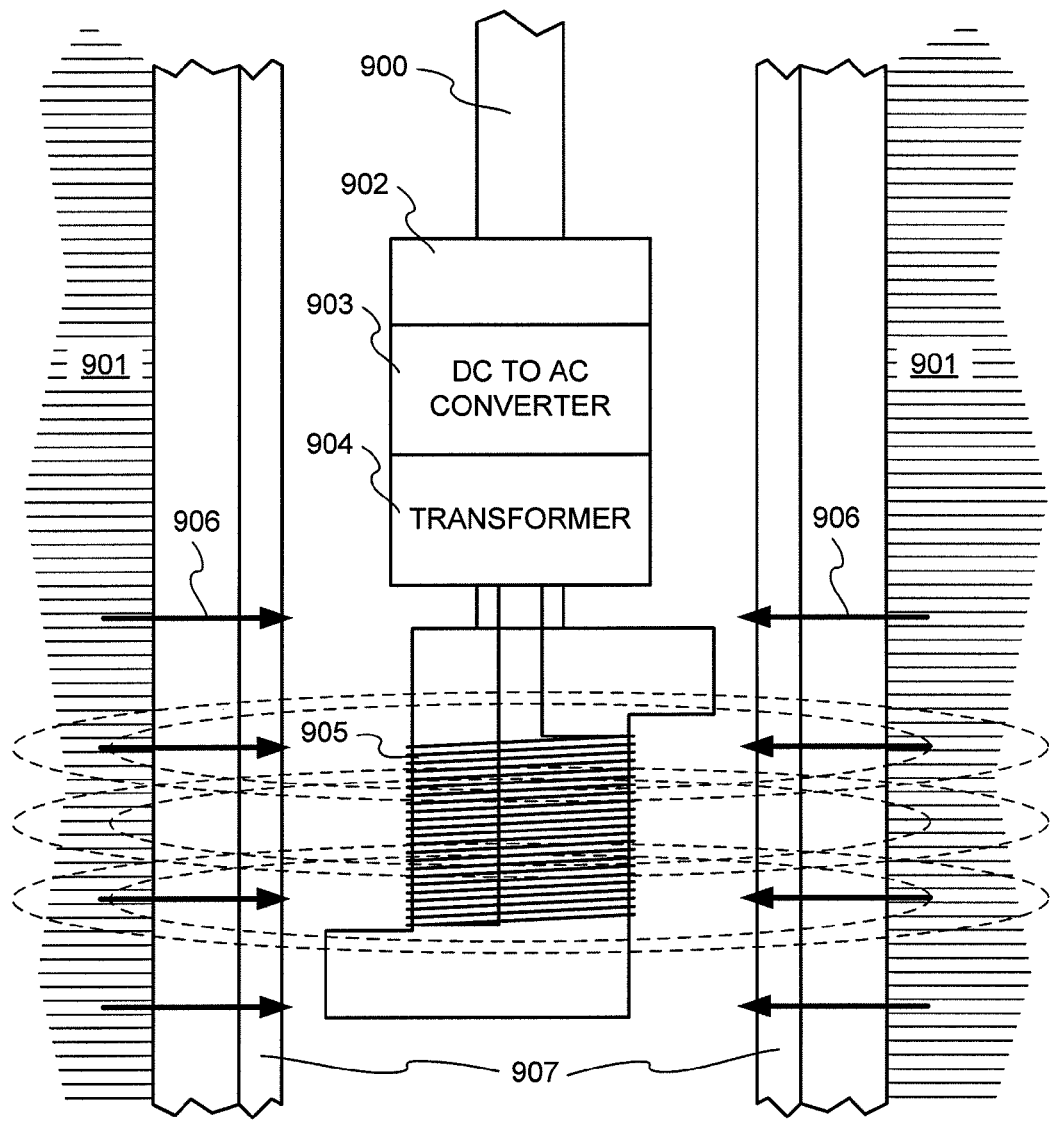
FIG. 9 illustrates the use of an umbilical according to embodiments of the invention to power a radio frequency (RF) heater.

FIG. 9 illustrates the use of an umbilical according to embodiments of the invention to power a radio frequency (RF) heater that may be used for downhole heating to improve flow through a geologic well formation, for water removal, or for other purposes. As shown in FIG. 9, an umbilical 900 according to embodiments of the invention may be suspended in a well, at a depth corresponding to a permeable oil-bearing formation 901. Umbilical 900 may include, for example, a medium voltage direct current cable or another means of transmitting power downhole. Coupled to umbilical 900 are a cable head 902, a DC to AC converter 903, and a transformer 904, configured to drive an RF antenna 905. DC to AC converter 903 converts DC power supplied through a cable in umbilical 900 to AC power, so that it can be altered by transformer 904. Transformer 904 may receive relatively high voltage low current power at a primary winding, and produce relatively low voltage high current power at a secondary winding, to be supplied to antenna 905. Antenna 905 in turn produces fluctuating electromagnetic fields that cause heating within formation 901. Flow 906 from formation 901 through perforations in casing 907 may be enhanced.

A heater such as the RF heater illustrated in FIG. 9 could also be used for in situ upgrading of product from a well. For example, crude oil or another mineral could be partially refined by heating it while still in the well, and the desirable products of the partial refinement preferentially extracted. An umbilical according to embodiments of the invention may provide the necessary power and control signals within the well, enabling in situ upgrading. A pump could also be attached to the bottom of the umbilical, and driven using power provided through the umbilical.

Figure 10A:
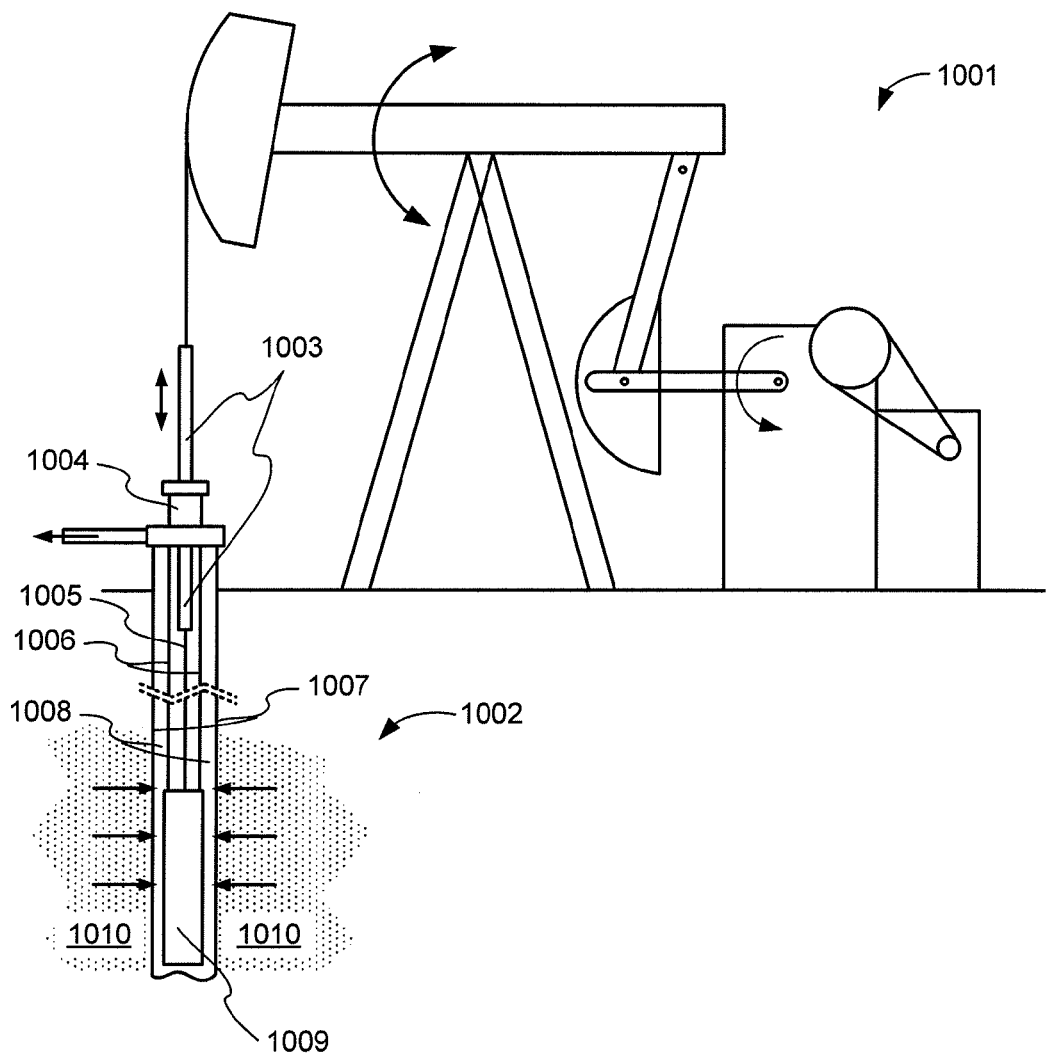
FIGS. 10A and 10B illustrate another application of an umbilical in accordance with embodiments of the invention.
Figure 10B:
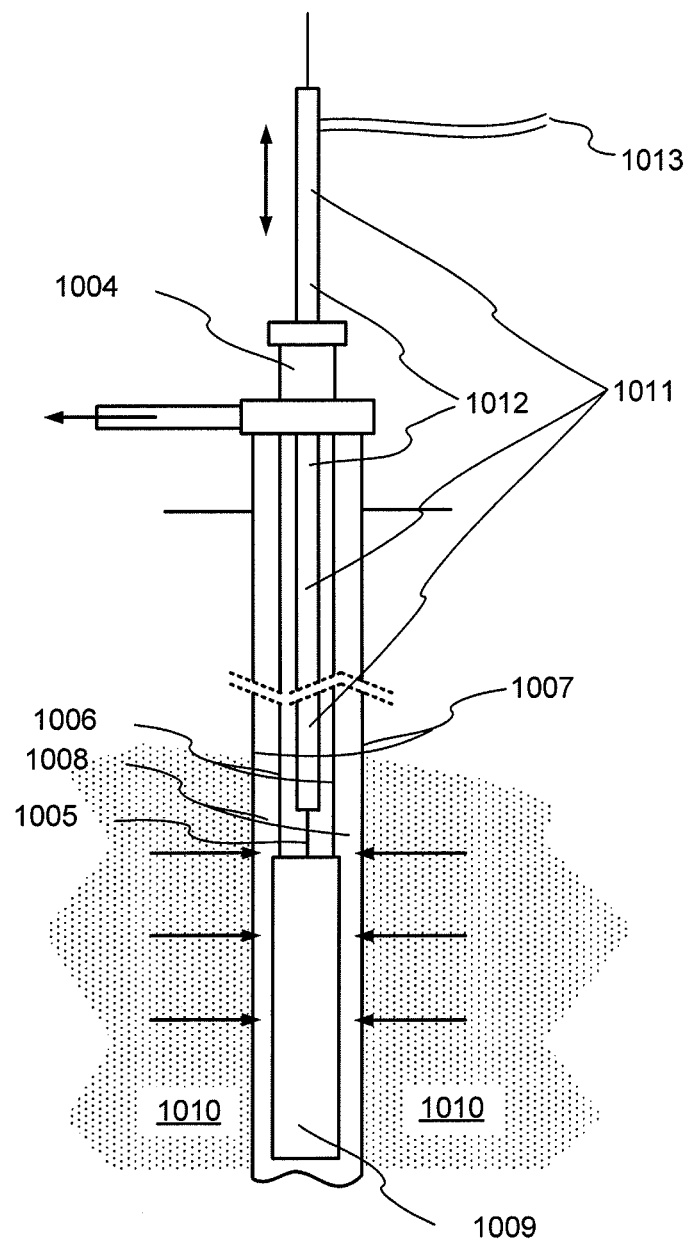

FIGS. 10A and 10B illustrate another application of an umbilical in accordance with embodiments of the invention. FIG. 10A shows a simplified view of a typical pumpjack 1001 for extracting oil or other products from a well 1002. Pumpjack 1001 moves a polished rod 1003 in a vertical reciprocating motion. Polished rod 1003 passes through a seal in fitting 1004, and connects to sucker rod 1005 within tubing 1006. Tubing 1006 is in turn disposed inside well casing 1007, leaving an annular space 1008 between tubing 1006 and casing 1007. A downhole pump 1009 is suspended from tubing 1006, and is actuated by the reciprocating motion of sucker rod 1005. Oil or other product flows from formation 1010 through perforations in casing 1007 and is taken up by pump 1009 and lifted up through tubing 1006 to fitting 1004, to be delivered above ground.

The conditions inside well 1002 may vary considerably with depth. For example, temperature and pressure may be lower at the surface than at the well bottom. The lower temperature and pressure in the upper portion of the well may enable wax formation, hydrate formation, or other phenomena that can clog tubing 1006. Clogging of tubing 1006 may result in diminished production from well 1002, or may require that well 1002 be temporarily taken out of production and serviced.

FIG. 10B illustrates a system in accordance with embodiments of the invention. Much of the upper portion of pumpjack 1001 has been omitted in FIG. 10B, for clarity. In the system of FIG. 10B, polished rod 1003 and at least some of sucker rod 1005 has been replaced by an umbilical 1011. Umbilical 1011 may be constructed according to the methods described above, and may include an outer metal tube of sufficient strength to carry the tensile load required to operate pump 1009. At least an upper portion 1012 of umbilical 1011 may be accurately formed and polished to engage with the seal in fitting 1004, ensuring a good seal and little or no leakage from fitting 1004.

Umbilical 1011 may carry a heater cable as previously described, for maintaining an elevated temperature within tubing 1006, thus preventing the formation of clogs and maintaining the productivity of well 1002. Heat may be provided by any suitable method, for example resistance heating or RF heating. In some embodiments, at least some of formation 1010 may also be heated, reducing the viscosity of oil within formation 1010, and facilitating the flow of product into well 1002. Power for umbilical 1011 may enter through leads 1013. Those skilled in the art will also realize that this can be also applied to a surface driven progressive cavity pump driven by a rotating umbilical, which can also provide heat and power along its length.

Figure 11:
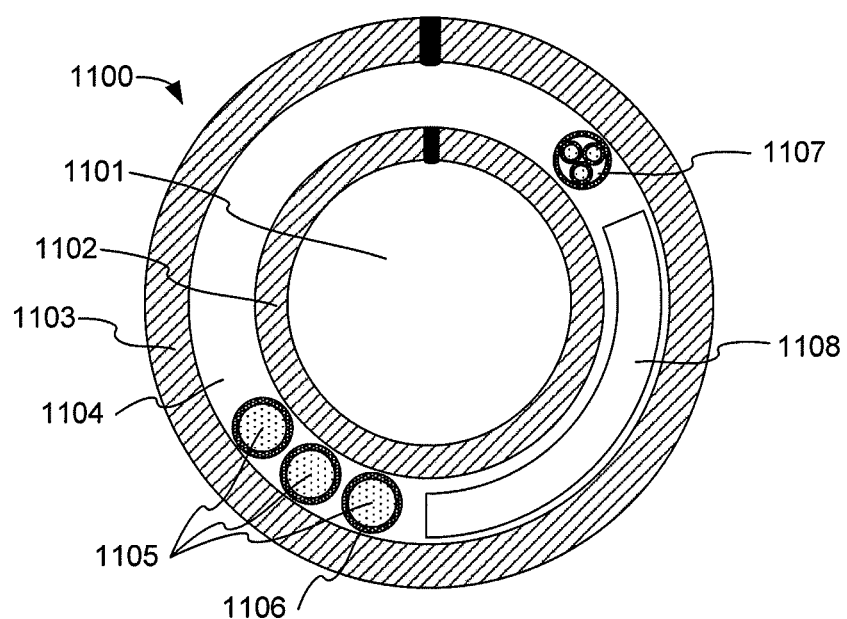
FIG. 11 illustrates a cross section view of a double walled umbilical, in accordance with embodiments of the invention.

FIG. 11 illustrates a cross section view of a double walled umbilical 1100, in accordance with embodiments of the invention. Double walled umbilical 1100 includes a fluid carrying passage 1101, surrounded by first metal tubing 1102, which is in turn surrounded by second metal tubing 1103. Double walled umbilical 1100 may be fabricated in a manner similar to that shown in FIG. 3, and may therefore be manufactured in extremely long lengths. First metal tubing 1102 may be pre-fabricated and then surrounded by second metal tubing 1103, or the two walls could be fabricated in series by multiple processing stations of the kind shown in FIG. 3. That is, a first set of rollers and welder could fabricate first metal tubing 1102 and pass that tubing immediately to a second set of rollers and a second welder that surrounds first metal tubing 1102 with second metal tubing 1103. An umbilical with three or more walls could be made in a similar way.

Annular gap 1104 between first metal tubing 1102 and second metal tubing 1103 may be filled with air, a vacuum, foam, or another fill material such as a fiberglass mat. Additionally, other service carriers may be placed within first metal tubing 1102 or in annular gap 1104. Merely by way of example, FIG. 11 illustrates a three-phase power cable 1105 comprising three conductors encased in high temperature tolerant and strain tolerant insulation 1106, an instrumentation cable 1107 having multiple conductors and also encased in high temperature tolerant and strain tolerant insulation, and an electric heater 1108. Heater 1108 may be any suitable kind of heater, for example a skin effect heater as described below. Many other combinations of service carriers could be included in a double walled umbilical such as umbilical 1100.

Figure 12A:
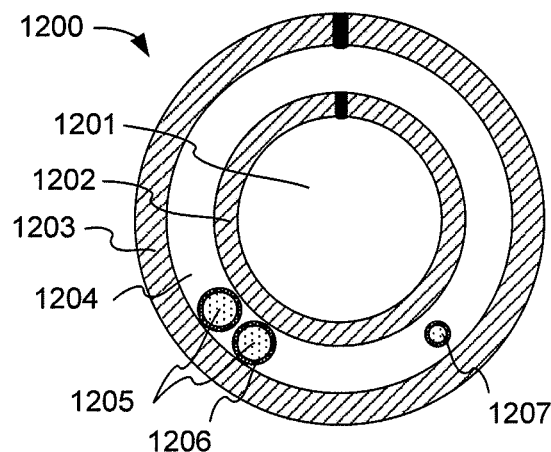
FIGS. 12A and 12B illustrate a skin effect heater formed in a section of an umbilical, in accordance with embodiments of the invention.
Figure 12B:
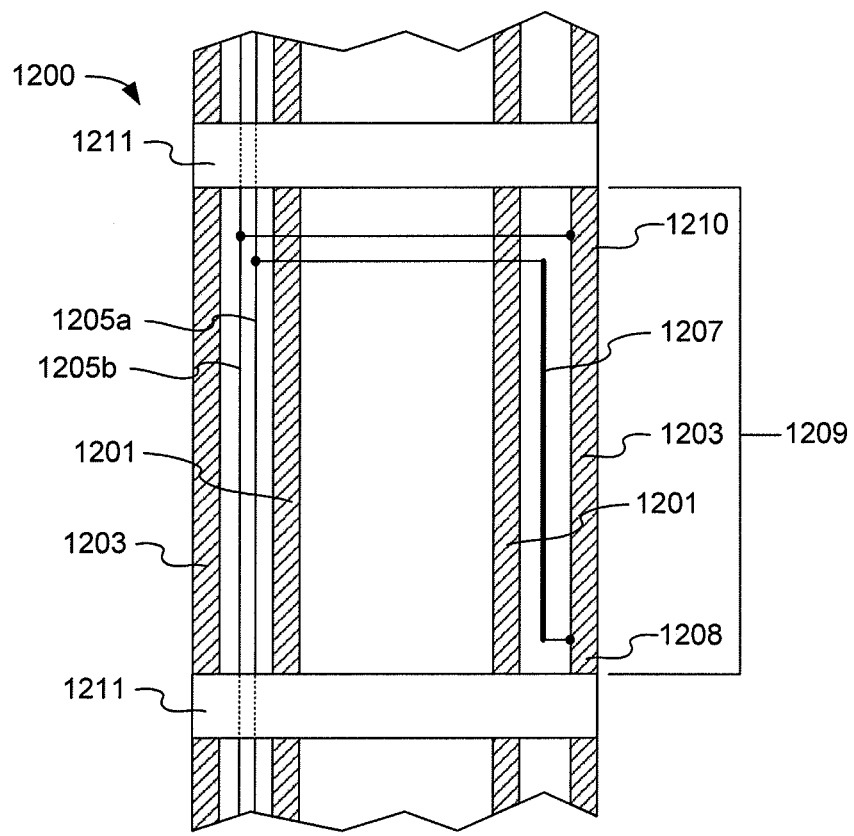

FIGS. 12A and 12B illustrate a skin effect heater formed in a section of an umbilical 1200, in accordance with embodiments of the invention. FIG. 12A shows a transverse cross section of umbilical 1200. Exemplary umbilical 1200 is double walled, including a fluid carrying passage 1201, surrounded by first metal tubing 1202, which is in turn surrounded by second metal tubing 1203. Umbilical 1200 may be fabricated as described above. Annular gap 1204 between first metal tubing 1202 and second metal tubing 1203 carries an AC power cable 1205 comprising two conductors encased in high temperature tolerant and strain tolerant insulation 1206. A separate insulated return conductor 1207 is also provided. Return conductor 1207 is preferably also encased in high temperature tolerant and strain tolerant insulation.

FIG. 12B illustrates the function of the skin effect heater schematically, in an axial cross section view. Insulation has been omitted from FIG. 12B for clarity of illustration. Insulated return conductor 1207 is electrically connected to an inner wall of second metal tubing 1203 near a first end 1208 of segment 1209. Insulated return conductor 1207 then extends substantially along the length of segment 1209 of umbilical 1200, and is electrically connected at the second end 1210 of segment 1209 to conductor 1205a, which is part of AC power cable 1205. Conductor 1205b is also part of AC power cable 1205, and is electrically connected to an inner wall of second metal tubing 1203 near second end 1210 of segment 1209. Insulated conductor 1207 and second metal tubing 1203 are thus connected in series between conductors 1205a and 1205b. When AC power cable 1205 is energized, a small amount of power is diverted so that alternating current flows through insulated conductor 1207 and second metal tubing 1203. Due to the skin effect, current flows only in an inner "skin" layer of second metal tubing 1203, and generates heat due to ohmic heating of second metal tubing 1203. Preferably, the skin effect heater uses only a portion of the power available from AC power cable 1205, so that additional power is available to operate other equipment in the well.

Segment 1209 of umbilical 1200 may be isolated from the rest of umbilical 1200, so that skin effect heating is provided only in a portion of the well. Dielectric couplings 1211 electrically isolate first metal tubing 1201 and second metal tubing 1203 from similar tubing in other portions of umbilical 1200. Umbilical 1200, including segment 1209, is conveniently made according to the technique illustrated in FIG. 3, and can be made in extremely long lengths if desired. Segment 1209 may be fabricated separately and spliced with other segments of umbilical 1200.

Figure 13A:
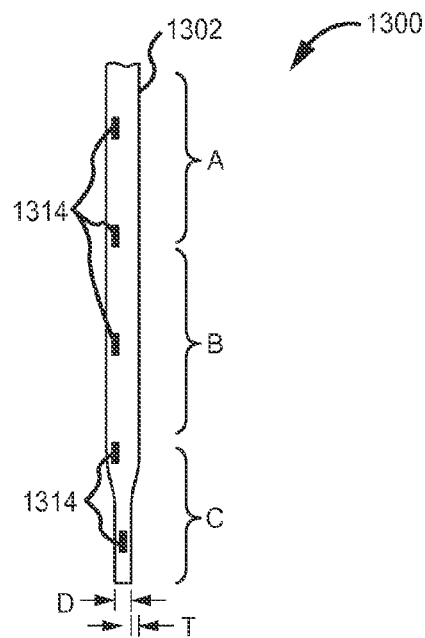
FIGS. 13A-D illustrate various aspects of an umbilical having longitudinally varying functionalities, in accordance with embodiments of the invention.
Figure 13B:
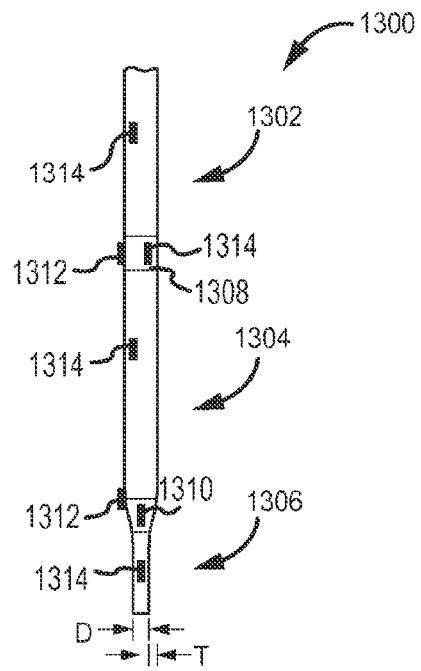

FIGS. 13A and 13B illustrate an umbilical 1300 that provides one or more different functions along the longitudinal length of umbilical 1300. FIG. 13A illustrates an umbilical 1300 that includes a single elongate metal tube body 1302. Umbilical 1300 may be constructed according to any of the methods described herein and may include a similar configuration to any of the umbilicals described herein (e.g., single walled umbilical, double walled umbilical, multiple service carrier, etc.). The elongate tube 1302 may include a first section A that includes a first service carrier (not shown) that provides a first functionality, a second section B that includes a second service carrier (not shown) that provides a second functionality, and a third section C that includes a third service carrier (not shown) that provides a third functionality. For example, third section C may include a heater, such as those described herein, to reduce the viscosity of oil at a distal location of the wellbore to facilitate extraction of oil. Third section C may also include a pump and/or chemical delivery device to extract the oil from the distal location of the wellbore (e.g., system 1800). Second section B may include power and electrical cables to provide power to various instruments located in the well, such as a heater, pumps, various sensors, and the like. First section A may include another heater that provides localized heating to the umbilical 1300 and/or the surrounding well as well as the power and the sensor lines in sections B and C of the umbilical. The localized heating may reduce the build of wax, precipitants, or other impediments to flow at a proximal location within the umbilical 1300 or surrounding well, or may remove the wax, precipitants, or other impediments therefrom. Thus, the functionality of the umbilical 1300 may be varied along its longitudinal length. Such umbilicals 1300 may replace the need for using multiple umbilicals since a single umbilical 1300 provides multiple localized functions.

It should be realized that the functionalities described in FIG. 13A are for illustrative purposes only and that virtually any functionality can be provided by first section A, second section B, and third section C depending on want or need. For example, the functionalities provided by the first section A, second section B, and/or third section C may include, among other things: a power conductor, a tube for carrying fluid, an electric heater, an electric cable, a pump, a fiber optic, communication cables, and the like. In one embodiment, the fluid carried in the tube is a solvent or diluent that may be introduced into the well to discourage or prevent the precipitation of by products that may clog the well and/or umbilical 1300, such as the formation of hydrates. The solvent or diluent may be heated within the umbilical prior to being introduced into the well to enhance the effectiveness of the solvent or diluent and further discourage the formation or precipitation of byproducts. A localized heater, such as a resistance heater, may be wrapped around the tube carrying the solvent or diluent or may be adjacent thereto to heat the solvent or diluent. In other embodiment, the fluid carried within the tube includes fluid extracted from the well, such as oil, water, or other fluids or gases. A pump may be attached at or near a distal end of umbilical 1300 to pump the fluid through a hollow service carrier to the surface or to another location within the well.

The cross section D of the umbilical 1300 may vary from one section to the next. For example, FIG. 13A illustrates that the cross section D of the third section C is slightly smaller than the cross sections of first section A and second section B. Thinner cross sections may allow umbilical 1300 to be inserted farther down the well, inserted into smaller wells, and/or wound onto the spool while requiring less space. Larger cross sections may provide added stiffness and rigidity to umbilical 1300 and/or allow more service carriers to be disposed within the umbilical. Cross section D of the umbilical 1300 may be varied depending on need and/or application. For example, the distal portions of umbilical 1300 that are inserted deep into the well may include smaller cross sections to facilitate insertion of the umbilical deep within the well and/or within tight spaces. The proximal portions of umbilical 1300 may include larger cross sections to provided added stiffness and rigidity and increase the compressive load the umbilical 1300 may receive and therefore, increase the pushability of the umbilical.

Similarly, the wall thickness T of metal tubing 1302 may be varied depending on need and/or application. For example, the wall thickness T of metal tubing 1302 in distal portions of the umbilical 1300 may be thinner to facilitate bending of the distal portions so that the umbilical can traverse one or more vertical, horizontal, and/or angular sections of the well. The wall thickness T of metal tubing 1302 in proximal portions may be thicker to provide added stiffness and rigidity.

Thinner wall thickness and/or thinner cross section diameters may accommodate various heating elements and/or thermal or electrical processes. For example, thinner wall thickness may provide less thermal and/or electrical resistance between the heating/electrical element within the umbilical 1300 and the surrounding well.

Umbilical 1300 may also include one or more sensors 1314 positioned along the longitudinal length (and or circumference) of the umbilical. Sensors 1314 may be any type of sensor for monitoring conditions within the well and/or within the umbilical 1300 including: temperature sensors, pressure sensors, voltage sensors, current sensors, and the like. Sensors 1314 may be disposed within the umbilical 1300. Sensors 1314 can measure the performance of various systems and components within the well, such as the performance of various motors, pumps, and the like. For example, sensors 1314 could provide feedback such as the amount of current being provided and whether a pump or motor is overheating. Sensors 1314 could also provide feedback about the fluid that is pumped out of the well or surrounding umbilical 1300. For example, sensors 1314 could provide feedback or information that is analyzed to determine if one or more precipitants or hydrates are forming within the umbilical 1300 and/or surrounding well as hot and pressurized fluid is pumped to cooler and less pressurized areas of the well. If the formation of such byproducts are identified, an umbilical with a heater and/or diluent/solvent delivery system (system 1800), or a section of the umbilical having such a system, could be positioned adjacent the byproducts and operated to remove the byproducts.

Figure 13C:
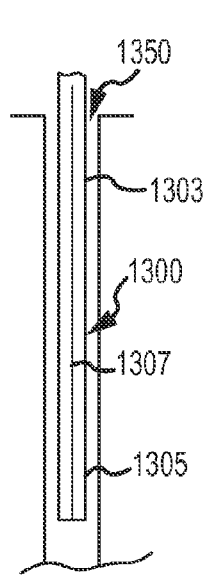

In addition, the pressure within umbilical 1300 may be varied along the length of the umbilical. For example, FIG. 13C illustrates umbilical 1300 inserted within well 1350. The pressure within umbilical 1300 may be increased so that the internal pressure at a distal end 1305 is greater than the pressure at a proximal end 1303. The pressure may vary linearly, for example, umbilical 1300 may include a column of fluid that provides increasing hydrostatic pressure at increasing depths. The internal pressure of umbilical 1300 may match an external pressure applied on an outer surface of umbilical 1300 by the fluid within the well, thereby minimizing a differential pressure across weld 1307 and/or other seals, which may prevent leaks.

FIG. 13B illustrates another embodiment of umbilical 1300 having varying functionalities along the longitudinal length. Umbilical 1300 of FIG. 13B may include spliced sections of one or more other umbilicals that are coupled together with one or more connectors 1308 and 1310. For example, umbilical 1300 includes a first section 1302, a second section 1304, and a third section 1306, where each section is a physically separate and distinct elongate welded metal tube. Each section may represent a spliced section taken from another umbilical. First section 1302 may be coupled with second section 1304 by connector 1308. Similarly, an additional connector 1310 may couple second section 1304 with third section 1306. The separate sections may vary in length or be roughly the same length.

The separate sections of umbilical 1300 of FIG. 13B may each provide one or more different functionalities so that the functionality of umbilical 1300 varies along the longitudinal length. Each of the separate sections may be configured to provide a specific functionality that may include: heating, power, electricity, pumping, precipitant removal, fluid delivery and/or removal, and the like. The cross sectional shape and/or size D of the different sections may vary, for example, first section 1302 may include a large-sized circular cross section while second section 1304 includes a small-sized elliptical or oval cross section. The wall thickness T of the different sections may also vary as described previously. Umbilical 1300 may also include one or more sensors 1314 disposed along the longitudinal length that provide various information and feedback about the operating conditions of the umbilical 1300 and/or well.

The connectors, 1308 and 1310, may include one or more ports 1312 that allow access to the well or an external space surrounding umbilical 1300. Ports 1312 may open and close, such as by being pressure sensitive to open when exposed to a sufficiently high pressure. Ports 1312 may also be opened in response to an electric signal. In one embodiment, ports 1312 may be opened to provide fluid communication between the interior of umbilical 1300 and the environment surrounding umbilical 1300 (i.e., the interior of the well). Diluents or solvents may be injected into the surrounding wellbore to prevent the formation of waxes, precipitants, hydrates, or other byproducts or effluents may be removed from the surrounding wellbore. In another embodiment, ports 1312 may be opened to inject one or more lubricants into the well space to facilitate insertion within or extraction of umbilical 1300 from the well. Ports 1312 may also include one or more sensors (not shown) that function similar to sensors 1314.

Connectors, 1308 and 1310, may allow the different sections (i.e., first section 1302, second section 1304, and the like) to be independently pressurized. For example, the pressure in first section 1302 may be pressurized to a greater amount than the pressure within second section 1304 or third section 1306. The pressure in the individual sections may be increased or decreased depending on need, environmental condition, application, and the like.

Figure 13D:
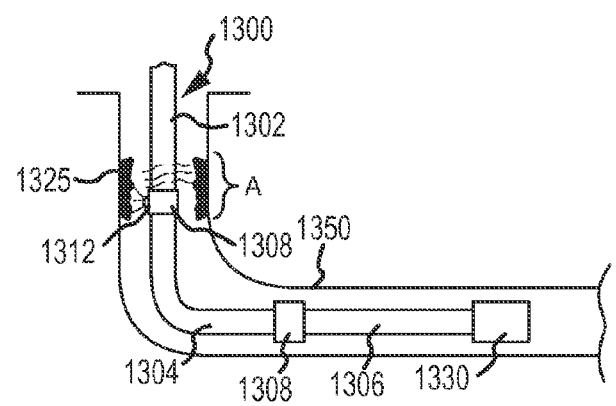

FIG. 13D illustrates an exemplary situation where pressurizing individual sections may provide an advantage. As illustrated, second section 1304 may be depressurized to allow second section 1304 to easily bend around a corner of the wellbore. First section 1302 and third section 1306 may be pressurized or remain pressurized to provided added stiffness and rigidity to umbilical 1300. Thus, the various sections of umbilical 1300 may be pressurized/depressurized so that the umbilical is flexible enough to adapt to directional changes in the wellbore, but stiff enough to be pushed into remote areas of the well. As described previously, connectors 1308 may allow the individual sections to be separately pressurized.

FIG. 13D also illustrates various other aspects of umbilical 1300. For example, FIG. 13D illustrates a machine or component 1330 (e.g., an electronic submersible pump, a heater, and the like) coupled with an end of third section 1306. Since umbilical 1300 is manufactured from a welded metallic tube or other stiff structure, umbilical 1300 provides a rigid stiff structure that may receive a compressive force to push component 1330 (e.g., pump, heater, and/or various other components) through horizontal, angled, and vertical sections of the well 1350. Likewise, umbilical 1300 may receive tensile forces to pull component 1330 through horizontal, angled, and vertical sections of the well 1350. The rigid and stiff structure of umbilical 1300 allows pumps and other components 1330 to access remote and deep areas of the well that may be far apart horizontally from a well site. Such remote areas may be inaccessible to pumps, heaters, fluid deliver/extraction system (e.g., system 1800), and other components without such rigid and stiff umbilicals 1300.

Third section 1306 may be pressurized to provide additional mechanical stiffness and rigidity to third section 1306 and thereby further enable third section 1306 to receive compressive and tensile loads to push or pull component 1330 (e.g., pump) through horizontal, angled, and vertical sections of the well 1350.

Component 1330 may be a pump, heater, fluid deliver/extraction system (e.g., system 1800), and the like. The pump may be used to pump fluid back to the surface while the heater is used to boil water present at the pumping location. The boiled water may reduce the viscosity of the oil, reduce the water concentration in the surrounding area, and/or create pressure that pushes the oil out of the well 1350, thereby reducing the pumping requirements and load. Umbilical 1300 may have two conduits (see FIG. 15) so that oil, a solvent/diluent, or another fluid, may be injected into the well 1350 through one conduit while oil is pumped to the surface through the other conduit.

FIG. 13D further illustrates first section 1302 being operated to remove precipitants or other effluents 1325 that have formed on the interior surface of a proximal portion A of the well 1350. First section 1302 includes a heater that is operated to de-solidify the precipitants or effluents 1325 upon the application of heat as characterized by the wavy radiation lines. To enhance the precipitant or effluent removal process, port 1312 of connector 1308 may be used to introduce solvents or diluents at the site A of the precipitants 1325, such as through system 1800 described herein.

While FIG. 13B illustrate umbilical 1300 having three separate sections, it should be realized that the umbilical may include more or less sections depending on need and/or application. For example, umbilical 1300 may include a fourth section, a fifth section, a sixth section, and so forth, that may each provide a respective functionality.

Figure 14A:
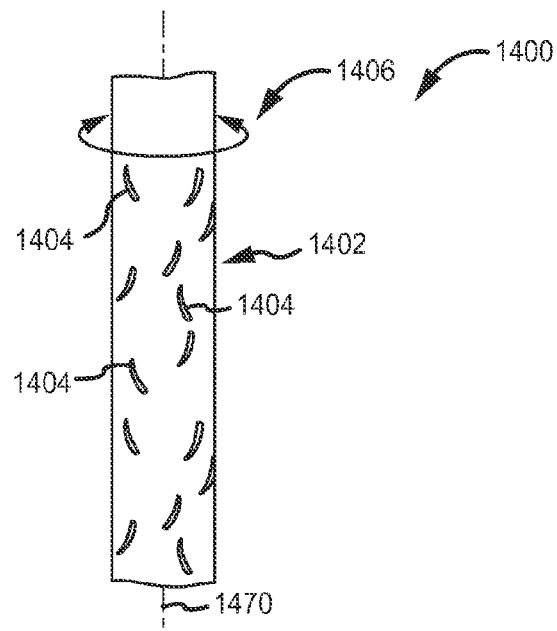
FIGS. 14A-C illustrate an umbilical having features that facilitate insertion or extraction of the umbilical with respect to a wellbore, in accordance with embodiments of the invention.
Figure 14B:
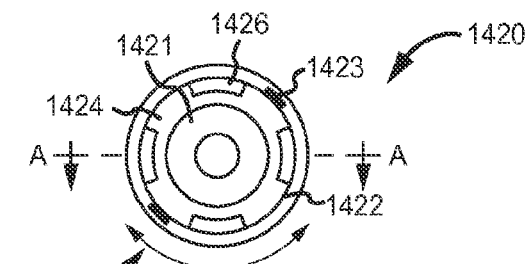
Figure 14C:
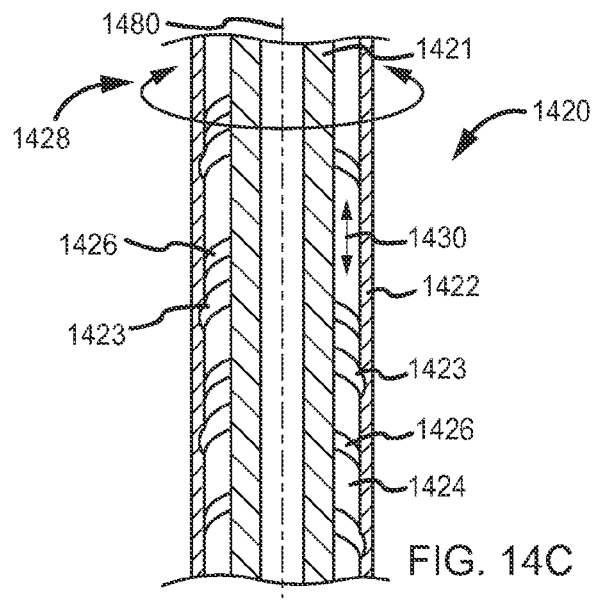

FIGS. 14A-C illustrate embodiments of an umbilical 1400 that facilitate insertion of the umbilical within a wellbore or extraction of the umbilical therefrom. Insertion of or extraction of umbilical 1400 may be facilitated by rotating or oscillating the umbilical about a longitudinal axis 1470. Rotating or oscillating the umbilical may reduce the resistance the umbilical 1400 experience from the wellbore. In some embodiments, the separate sections of the umbilical (e.g., the first, second, and third section described previously) may be rotated or oscillated separately about their respective longitudinal axis so as to facilitate insertion or extraction of the individual segments. The rotation or oscillation of the sections may be performed by applying a load to the external surface of umbilical 1400 and/or by applying a load to the interior of the umbilical.

Applying an external or internal load may include varying flow within the well or within umbilical 1400. For example, increasing a fluid flow within the well or umbilical may cause umbilical 1400 to rotate in one direction about longitudinal axis 1470 while decreasing the fluid flow may cause the umbilical to relax (e.g., relieve strain induced by the flow) and rotate in an opposite direction. Thus, umbilical 1400 may be forced to oscillate back and forth by increasing and decreasing a fluid flow within the well and/or umbilical 1400.

As shown in FIG. 14A, the external surface 1402 of umbilical 1400 may include a plurality of external fins or guides 1404 spaced longitudinally along the umbilical. The external fins or guides 1404 may act as a hydrofoil and cause umbilical 1400 to rotate or oscillate 1406 about longitudinal axis 1470 as a fluid flow (rate and direction) is varied within the wellbore. Similarly, external fins or guides 1404 may cause umbilical 1400 to rotate or oscillate 1406 as the umbilical is pushed down the wellbore or extracted therefrom. Further, the hydrofoil external fins 1404 may cause the external surface 1402 of umbilical 1400 to float off the bottom surface of the wellbore when the umbilical is inserted through angled and/or horizontal sections of the well and/or float external surface 1402 off the side walls of vertical sections of the wellbore. Floating external surface 1402 of umbilical 1400 off the bottom surface and side walls of the wellbore may reduce the overall frictional force applied to the umbilical. External fins or guides 1404 may be small angled components attached to the external surface 1402 of umbilical 1400 or formed therefrom. In other embodiments, external fins or guides 1404 may include large angled components that wrap substantially around the external surface 1402 of umbilical 1400 or a portion thereof.

FIG. 14B-C illustrate an embodiment of applying internal loads within umbilical 1420 to cause the umbilical to rotate or oscillate 1428 about longitudinal axis 1480. FIG. 14C illustrates a longitudinally cutaway of the umbilical 1420. As shown, umbilical 1420 includes an internal space 1424 between one or more service carriers or internal components 1421 and external wall 1422 (e.g., welded metal tube). Internal space 1424 includes a plurality of fins 1426 that protrude from external wall 1422 into the internal space 1424 and/or includes a plurality of guides 1423 that are grooved or recessed portions of external wall 1422. Internal space 1424 also includes a column of fluid (not shown). As the column of fluid flows 1430 through internal space 1424 and/or as the column of fluid is pressurized and depressurized within internal space 1424, umbilical 1420 is forced to rotate or oscillate 1428 back and forth about longitudinal axis 1480. Umbilical 1420 and/or 1400 may include one or more sections that include rotation/oscillation producing features.

Figure 15:
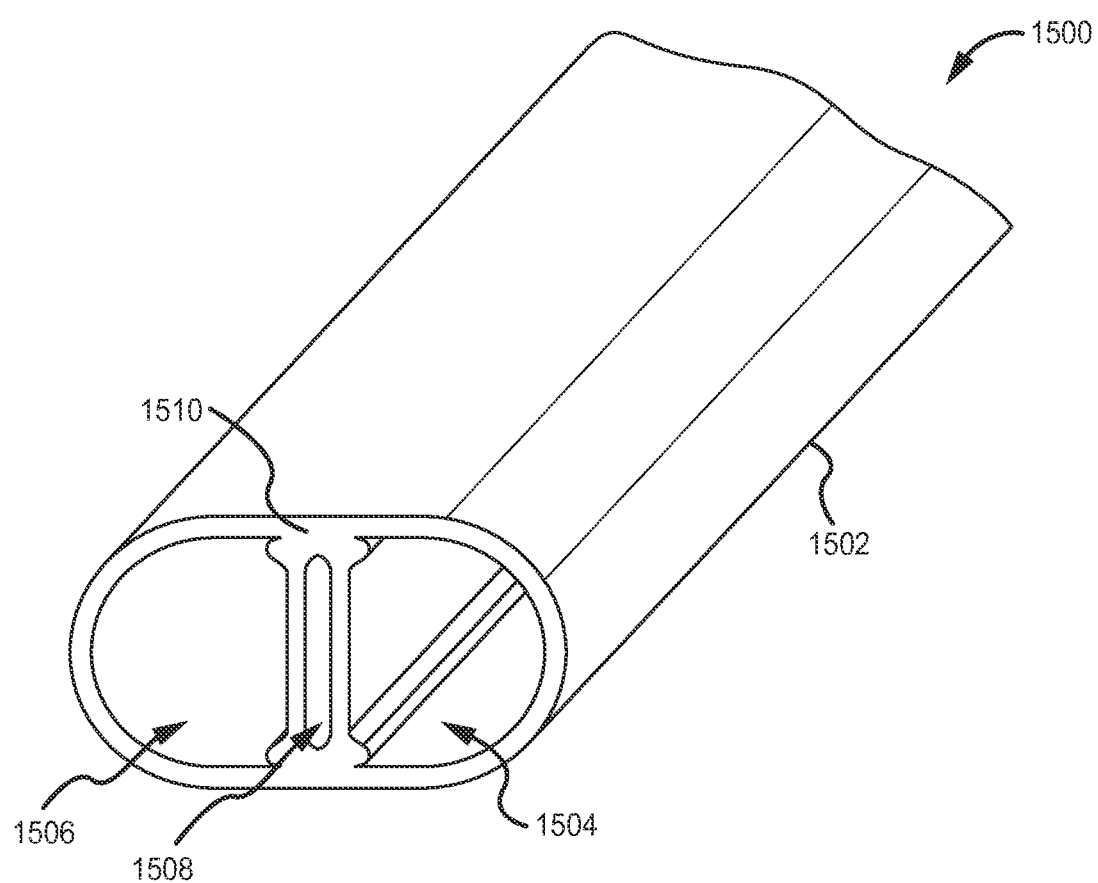
FIG. 15 illustrates another embodiment of an umbilical, in accordance with embodiments of the invention.

FIG. 15 illustrates another embodiment of an umbilical 1500. Umbilical 1500 includes an elongate tube 1502 made of metal (e.g., welded tube) or another rigid material. Tube 1502 may be circular in cross section or non-circular, such as elliptical or oval as shown in FIG. 15. Disposed within tube 1502 is an internal support 1508. Internal support 1508 is coupled with opposite interior surfaces of tube 1502. Internal support 1508 may include a lumen 1510 that extends along a portion of internal support 1508 or along the entire length of the internal support. Internal support 1508 may be used to support the non-circular cross section and keep the non-circular tube 1502 from collapsing.

Internal support 1508 may also divide or separate a first conduit 1504 and a second conduit 1506 to isolate service carriers, components, and/or fluids within the respective conduits. For example, in one embodiment, electrical cables can be run through first conduit 1504 while a solvent or diluent is transported through second conduit 1506. In a specific embodiment, first conduit 1504 includes an injection conduit that transports solvents or diluents to a production location within the well while second conduit 1506 includes an extraction conduit that transports oil or other fluids from the production location. Power cables that are used to run an electric submersible pump, solvent/diluent injection device, or other components (e.g., system 1800) at the production location may be run through lumen 1510 of internal support 1508. Thus, internal support 1508 may isolate the fluids/chemicals injected into the well from the oil/effluents being extracted therefrom while also isolating the power/electrical cables used in various machinery and components to extract the oil/effluents and inject the various fluids/chemicals. It should be realized that this example is merely for illustrative purposes and that the first and second conduits may be used with or as various service carriers to transport various fluids, cabling, optics, and the like.

Figure 16:
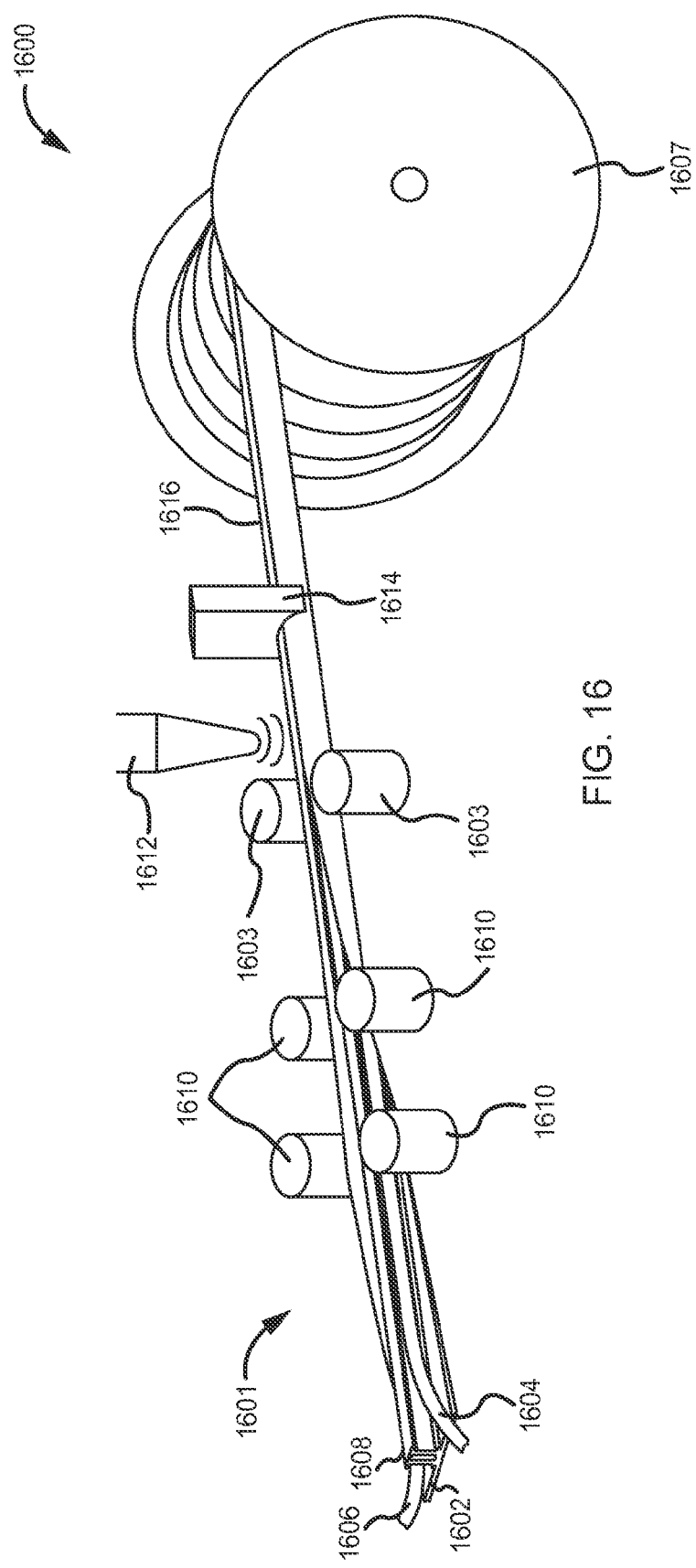
FIG. 16 illustrates the formation of an umbilical of FIG. 15, in accordance with embodiments of the invention.

FIG. 16 illustrates the formation of an umbilical of FIG. 15, in accordance with embodiments of the invention. An internal support 1608 is aligned with metal strip 1602 and welded (e.g., tack weld) to a surface of the metal strip 1602. A first service carrier 1604 and a second service carrier 1606, which may be encased in insulation and/or further embedded in a fill material as described previously, are aligned with metal strip 1602 and positioned on opposite sides of internal support 1608. The metal strip 1602 having the welded internal support 1608 and positioned service carriers, 1604 and 1606, is then passed to a mill 1601. Within mill 1601, a series of rollers 1610 gradually forms strip 1602 into a tube shape around the service carriers, 1604 and 1606, and over internal support 1608. The tube shape may be circular or non-circular, including oval, elliptical, square, rectangular, and the like. A final set of rollers 1603 may force the edges of strip 1602 together over internal support 1608 and service carriers, 1604 and 1606, and a welder 1612 welds the edges of the metal strip together to form a closed tube around the service carriers 1604 and 1606 and internal support 1608. The welder 1612 may also weld the upper surface of the metal strip 1602 to the internal support 1608.

Welder 1612 may be, for example, a high frequency induction welding machine that fuses the edges with a continuous longitudinal seam. Portions of the metal tube may reach temperatures of about 1650° F. (900° C.) during the welding process. In induction welding, no fill material is used, and a small bead may be formed on both the inside and the outside of the resulting tube. The inside bead may weld the upper surface of the metal strip 1602 to the internal support 1608. A scarfing tool 1614 may remove the external bead. Other finishing treatments may be applied as described in relation to FIG. 3.

Completed umbilical 1616 is then coiled onto a spool 1607 for storage and transportation. Because the materials used in making umbilical 1616 can withstand high temperatures and bending, umbilical 1616 can be coiled onto spool 1607 and later uncoiled for use while substantially maintaining the performance of its insulation. Inspection of umbilical 1616 may be performed before or after coiling onto spool 1607, or both. Umbilical 1616 is sufficiently stiff to be inserted into a deep well, and is sufficiently flexible and durable to be coiled onto spool 1607 and to accommodate directional changes in a well into which umbilical 1616 may be inserted. The metal tubing forming the outside of umbilical 1616 provides excellent resistance to the hostile environments that may be encountered in a well or other location where umbilical 1616 may be used.

Figure 17:
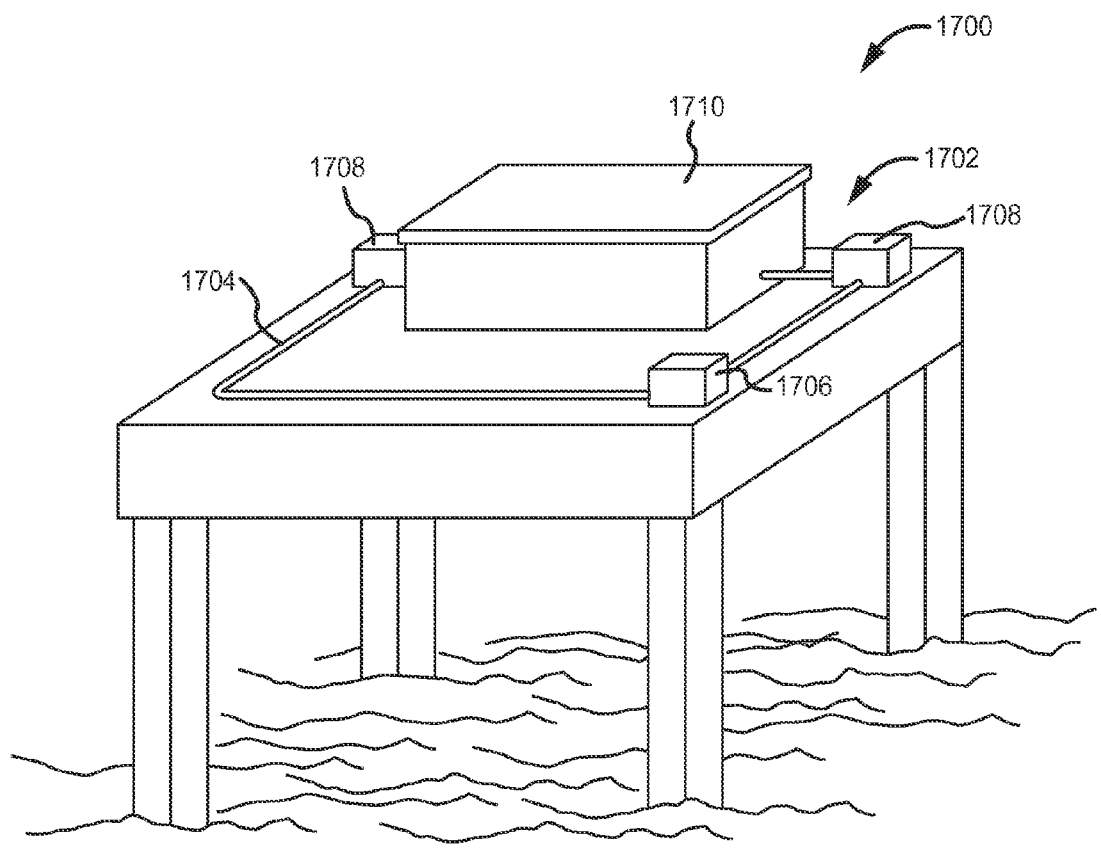
FIG. 17 illustrates an application of the umbilicals described herein, in accordance with embodiments of the invention.

FIG. 17 illustrates an exemplary application 1700 of the umbilicals described herein. Umbilical 1704 is deployed or run along a surface of a structure 1702, such as the surface of an offshore or onshore oil rig or along the sea floor, to provide various functionalities, such as power, communication, fluid transportation, pumping, and the like. Umbilical 1704 is connected to a functionality source 1706 (e.g., a power source, communication network, water source, gas source, and the like) and run to and connected with one or more components and/or machinery 1708 that require the functionality (e.g., power). Umbilical 1704 may also be run to and connected to an operational station or housing 1710.

According to one embodiment, umbilical 1704 is deployed as electrical cables to provide power and communication to various components 1708, machinery, and control units 1710 on an offshore/onshore oil rig 1702. Umbilical 1704 replaces the need to run electrical cables through conduit on oil rig 1702. Umbilical 1704 is fire and explosion proof and thus, safe for such operations. Further, umbilical 1704 is flexible, lightweight, and provides quick, easy, and low cost installation since it can be deployed on site for various jobs and applications and spooled up and maintained on site when such jobs or application are completed. Additional umbilicals may also be deployed and used on oil rig 1702 to provide other functionalities, such as communication/networking, potable water, sanitation, and the like. Similarly, umbilicals 1704 may be deployed or run between various oil rigs, along the sea floor, on ships or other vessels, on building sites, in temporary field unit housing, and/or for any other application.

As described herein, the umbilical may be used to prevent formation of hydrates, precipitants, or other byproducts or may be used to remove such byproducts by introducing heat and/or chemicals at one or more locations within the wellbore. For example, solvents or diluents may be introduced at specific locations within the wellbore and mixed with oil to prevent or minimize precipitation of byproducts. Likewise, a certain temperature may be maintained at specific location in the wellbore to minimize precipitation. The umbilical may also be used to extract oil, fluids, and other products from the wellbore.

Figure 18:
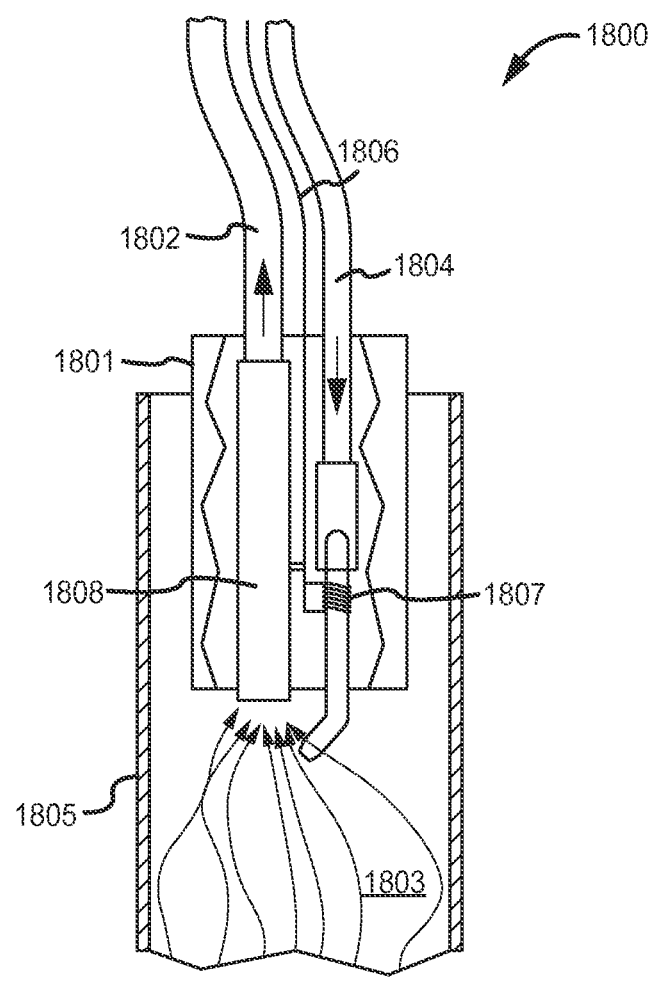
FIG. 18 illustrates a fluid delivery and extraction system utilizing the umbilicals described herein, in accordance with embodiments of the invention.

FIG. 18 illustrates a portion of a well servicing system 1800 that may be used to prevent hydrate/precipitant formation, remove hydrates/precipitants, and/or extract oil and other fluids from the wellbore 1805. System 1800 includes an umbilical 1802 and also includes a fitting 1801 connected to the lower end of umbilical 1802. Umbilical 1802 includes a collection conduit for carrying effluent 1803 (e.g., oil, hydrates, precipitants, etc.) from the well 1805 to a collection station, and at least one power cable 1806. An additional umbilical 1804 may be provided that include a diluent conduit for carrying diluent to the well 1805. In some embodiments, a single umbilical may be used that includes a conduit for carrying effluent 1803, a conduit for carrying diluent, and for carrying power cable 1806, such as umbilical 1500 or any of the other umbilicals described herein.

Either or both of umbilical 1802 and 1804 (or a single umbilical comprising both conduits) may be deployed by uncoiling the coiled tubing from a spool as fitting 1801 is lowered to the well 1805. An electric heater 1807 may be provided, drawing its power from power cable 1806. Electric heater 1807 is positioned to heat diluent supplied via diluent carrying umbilical 1804 near a lower end of umbilical 1802. The heated diluent may mix with effluent 1803 to both heat effluent 1803 to prevent the formation of hydrates before or while effluent 1803 travels through the collection conduit of umbilical 1802. System 1800 thus provides local heating of effluent 1803, and may be able to reach higher temperatures than would be achievable by piping pre-heated diluent from the surface.

An electric submersible pump 1808 may also be provided, to assisting in lifting effluent 1803 through the collection conduit of umbilical 1802 to the collection station. Electric submersible pump 1808 is also preferably powered via power cable 1806. System 1800 may be utilized at one or more of the ports 1312 of connector 1310 to introduce diluents into the wellbore 1805 and/or extract effluents 1803 therefrom.

Many other configurations and applications may be envisioned for umbilicals according to embodiments of the invention. For example, umbilicals may be used to supply power, supply fluids, or carry control signals (or some combination of these) to a wide range of downhole equipment, including but not limited to pumps, motors, sensors, drills, steam generators, electric power conditioning equipment, and fiber optics for temperature measurement or other applications. It should also be noted that umbilicals as described herein can also be used to power seabottom oil production equipment as well as for purposes such as dredging, mining and mineral processing, and the like.

The invention has now been described in detail for the purposes of clarity and understanding. However, those skilled in the art will appreciate that certain changes and modifications may be practiced within the scope of the appended claims.

What is claimed is:

1. An umbilical, comprising:
   an elongate welded metal tube configured for insertion into downhole wells, the elongate welded metal tube comprising:
     a first longitudinal section of the elongate welded metal tube, the first longitudinal section encasing a first service carrier that provides a first functionality;
     a second longitudinal section of the elongate welded metal tube, the second longitudinal section encasing a second service carrier that provides a second functionality different than the first functionality, wherein the second longitudinal section and the first longitudinal section are not located within the same longitudinal section of the elongated welded metal tube, and wherein an end of the first longitudinal section is coupled with an end of the second longitudinal section; and
     a plurality of sensors disposed within the first longitudinal section and positioned along the longitudinal length of the first longitudinal section, and not disposed within the second longitudinal section, wherein each of the plurality of sensors monitor conditions within the first longitudinal section of the downhole well.

2. The umbilical of claim 1, further comprising a connector that couples the first longitudinal section and the second longitudinal section wherein the connector comprises a port that provides fluid communication between the interior of the elongated welded metal tube and the interior of the well or the connector comprises a sensor that monitors one or more conditions of the umbilical or the downhole well.

3. The umbilical of claim 1, further comprising a connector that couples the first longitudinal section and the second longitudinal section wherein the first longitudinal section and the second longitudinal section comprises separate elongate welded tubes.

4. The umbilical of claim 1, further comprising a connector that couples the first longitudinal section and the second longitudinal section wherein the first longitudinal section is pressurizable to a first pressure and the second longitudinal section is pressurizable to a second pressure different than the first pressure so that the pressure within the umbilical is variable longitudinally.

5. The umbilical of claim 1, wherein either or both a cross sectional shape and a cross sectional size of the first longitudinal section is different than the second longitudinal section.

6. The umbilical of claim 1, wherein the wall thickness of the elongate welded metal tube varies along the longitudinal length of the umbilical.

7. The umbilical of claim 1, wherein the first functionality and the second functionality comprise a functionality selected from the group consisting of: a power conductor, a tube for carrying fluid, an electric heater, an electric cable, a pump, a sensor cable including fiber optic, and a radio frequency antenna.

8. The umbilical of claim 7, wherein the fluid carried in the tube comprises a diluent that is introduced into the downhole well to discourage a formation of one or more precipitants or the fluid comprises a fluid that is extracted from the downhole well.

9. The umbilical of claim 8, wherein the diluent is heated within the umbilical prior to being introduced into the downhole well.

10. The umbilical of claim 1, wherein the umbilical comprises a plurality of sensors spaced longitudinally along the elongate welded metal tube, the plurality of sensors providing information about one or more conditions of the umbilical or the downhole well.

11. The umbilical of claim 1, further comprising a pump coupled with the elongate welded metal tube at or substantially near a distal end of the elongate welded metal tube, wherein the rigidity of the elongate welded metal tube allows the pump to be pushed through one or more vertical or horizontal sections of the downhole well.

12. The umbilical of claim 1, wherein each of the plurality of sensors comprises a sensor selected from the list consisting of temperature sensors, pressure sensors, voltage sensors, and current sensors.

13. An umbilical, comprising:
   a welded metal tube configured for insertion into downhole wells, the welded metal tube having an inner surface, an outer surface, and a longitudinal length;
   an internal support coupled with opposite sides of the inner surface and extending along at least a portion of the longitudinal length, the internal support separating a first conduit and a second conduit;
   a first service carrier disposed within the first conduit, the first service carrier providing a first functionality;
   a second service carrier disposed within the second conduit, the second service carrier providing a second functionality different than the first functionality, wherein an end of the first longitudinal section is coupled with an end of the second longitudinal section; and a plurality of sensors disposed along the longitudinal length of the first service carrier and within the first service carrier, wherein each of the plurality of sensors monitor conditions within the first service carrier or the downhole well.

wherein the umbilical is wrapped onto a spool for deployment.

14. The umbilical of claim 13, wherein the internal support comprises a lumen that extends along the length of the internal support.

15. The umbilical of claim 14, wherein one or more cables are inserted through the lumen of the internal support.

16. An umbilical, comprising:

an elongate welded metal tube configured for insertion into downhole wells, the elongate welded metal tube comprising:

a first longitudinal section, the first longitudinal section encasing a first service carrier that provides power;

a second longitudinal section, the second longitudinal section encasing a second service carrier that provides heat, wherein an end of the first longitudinal section is coupled with an end of the second longitudinal section; and a plurality of sensors disposed along the longitudinal length of the first longitudinal section, wherein each of the plurality of sensors monitor conditions within the first longitudinal section or the downhole well.

\* \* \* \* \*